US012762196B2

(12) United States Patent
Lou et al.

(10) Patent No.: US 12,762,196 B2
(45) Date of Patent: *Oct. 13, 2026

(54) PROVIDING SEARCH RESULTS BASED ON A COMPOSITIONAL QUERY

(71) Applicant: Google LLC, Mountain View, CA (US)

(72) Inventors: Jinyu Lou, Shanghai (CN); Ying Chai, Shanghai (CN); Chen Ding, Redwood City, CA (US); Lijie Chen, Shanghai (CN); Liang Hu, Hubei (CN); Kejia Liu, Shanghai (CN); Weibin Pan, Shanghai (CN); Yanlai Huang, Shanghai (CN); David Francois Huynh, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,194

(22) Filed: Sep. 18, 2023

(65) Prior Publication Data

US 2024/0078274 A1 Mar. 7, 2024

Related U.S. Application Data

(63) Continuation of application No. 17/105,991, filed on Nov. 27, 2020, now Pat. No. 11,762,933, which is a (Continued)

(51) Int. Cl.

| | |
|---|---|
| ***G06F 16/9537*** | (2019.01) |
| ***G06F 16/248*** | (2019.01) |
| ***G06F 16/28*** | (2019.01) |

(52) U.S. Cl.

CPC ........ *G06F 16/9537* (2019.01); *G06F 16/248* (2019.01); *G06F 16/284* (2019.01); *G06F 16/288* (2019.01)

(58) Field of Classification Search

None

See application file for complete search history.

(56) References Cited

U.S. PATENT DOCUMENTS

| | | | |
|---|---|---|---|
| 8,489,641 | B1 | 7/2013 | Seefeld et al. |
| 2004/0080510 | A1 | 4/2004 | Inokuchi et al. |

(Continued)

FOREIGN PATENT DOCUMENTS

| | | |
|---|---|---|
| CN | 1601526 A | 3/2005 |
| CN | 1936896 A | 3/2007 |

(Continued)

OTHER PUBLICATIONS

Notice of Allowance for CN Application No. 201280078167.9, mailed May 6, 2020, 5 pages.

(Continued)

*Primary Examiner* — Yu Zhao

(74) *Attorney, Agent, or Firm* — BRAKE HUGHES BELLERMANN LLP

(57) ABSTRACT

A technique for providing search results may include determining a first entity type, a second entity type, and a relationship type based on a compositional query. The technique may also include identifying nodes of a knowledge graph corresponding to entity references of the first entity type and entity references of the second entity type. The technique may also include determining from the knowledge graph an attribute value corresponding to the relationship type for each entity reference of the first entity type and for each entity reference of the second entity type. The technique may also include comparing the attribute value of each entity reference of the first entity type with the attribute value of each entity reference of the second entity type. The technique may also include determining one or (Continued)

more resultant entity references from the entity references of the first entity type based on the comparing.

19 Claims, 15 Drawing Sheets

Related U.S. Application Data continuation of application No. 14/651,381, filed as application No. PCT/CN2012/086422 on Dec. 12, 2012, now Pat. No. 11,003,729.

(56) References Cited

U.S. PATENT DOCUMENTS

| | | | | |
|---|---|---|---|---|
| 2004/0122674 | A1* | 6/2004 | Bangalore | G10L 15/26 704/E15.045 |
| 2004/0260465 | A1* | 12/2004 | Tu | G01C 21/34 701/426 |
| 2005/0080764 | A1 | 4/2005 | Ito | |
| 2005/0108024 | A1 | 5/2005 | Fawcett et al. | |
| 2005/0149538 | A1 | 7/2005 | Singh et al. | |
| 2006/0026189 | A1 | 2/2006 | Djugash et al. | |
| 2006/0149734 | A1 | 7/2006 | Egnor et al. | |
| 2006/0161523 | A1 | 7/2006 | Dettinger et al. | |
| 2007/0067274 | A1 | 3/2007 | Han et al. | |
| 2007/0266041 | A1 | 11/2007 | Beckman et al. | |
| 2008/0010259 | A1* | 1/2008 | Feng | G06F 16/9537 |
| 2010/0211192 | A1 | 8/2010 | Stluka et al. | |
| 2010/0235340 | A1 | 9/2010 | Todhunter et al. | |
| 2011/0113064 | A1 | 5/2011 | Govindachetty et al. | |
| 2011/0282892 | A1 | 11/2011 | Castellani et al. | |
| 2011/0313866 | A1 | 12/2011 | Park | |
| 2012/0078873 | A1 | 3/2012 | Ferrucci et al. | |
| 2012/0158633 | A1 | 6/2012 | Eder | |
| 2012/0159371 | A1* | 6/2012 | Thrapp | G06F 16/29 715/772 |
| 2012/0272185 | A1 | 10/2012 | Dodson et al. | |
| 2013/0185286 | A1 | 7/2013 | Galitsky et al. | |

FOREIGN PATENT DOCUMENTS

| | | | |
|---|---|---|---|
| CN | 1945581 | A | 4/2007 |
| CN | 101136028 | A | 3/2008 |
| CN | 101802773 | A | 8/2010 |
| WO | 2008134588 | A1 | 11/2008 |

OTHER PUBLICATIONS

Office Action for Chinese Patent Application No. 201280078167.9, mailed Mar. 27, 2018, 32 pages.
Office Action for CN Application No. 201280078167.9, mailed Sep. 30, 2019, 38 pages.
PCT International Search Report and Written Opinion for PCT Application No. PCT/CN2012/086422, mailed Sep. 19, 2013, 8 pages.
Office Action for CN Application No. 201280078167.9 (with English Translation), mailed Feb. 20, 2019, 38 pages.
Huynh, "Freebase Cubed: Text-Based Collection Queries for Large, Richly Interconnected Data Sets", Metaweb Technologies, Inc., 2009, pp. 66-69.
Huynh, "Freebase Parallax: a Novel Way To Browse and Explore Data", Vimeo, https://vimeo.com/1513562, Aug. 11, 2008, 5 pages.
Huynh, et al., "Parallax and Companion: Set-Based Browsing for the Data Web", WWW 2009, 2009, 10 pages.
Li, et al., "Entity-Relationship Queries Over Wikipedia", SMUC 2010, Oct. 30, 2010, pp. 21-28.
First Office Action for Chinese Application No. 202010704673.0 (with English translation), mailed Jun. 28, 2024, 13 pages.

* cited by examiner

200

| | Type 1 | Type 2 | Type 3 | ... | Type N |
|---|---|---|---|---|---|
| ID 1 | 10 | 20 | 300 | ... | 15 |
| ID 2 | 15 | 40 | 100 | ... | 45 |
| ⋮ | ⋮ | ⋮ | ⋮ | ⋱ | ⋮ |
| ID M | 3 | 50 | 10 | ... | 100 |

250

| | Type 1 | Type 2 | Type 3 | ... | Type N |
|---|---|---|---|---|---|
| ID 1 | ID_a1 , 10 | ID_b1 , 20 | ID_c1 , 300 | ... | ID_d1 , 15 |
| ID 2 | ID_a2 , 15 | ID_b2 , 40 | ID_c2 , 100 | ... | ID_d2 , 45 |
| ⋮ | ⋮ | ⋮ | ⋮ | ⋱ | ⋮ |
| ID M | ID_aM , 3 | ID_bM , 50 | ID_cM , 10 | ... | ID_dM , 100 |

FIG. 2

PROVIDING SEARCH RESULTS BASED ON A COMPOSITIONAL QUERY

CROSS-REFERENCE TO RELATED APPLICATIONS

This application is a continuation of, and claims priority to, U.S. patent application Ser. No. 17/105,991, filed on Nov. 27, 2020, which claims priority to U.S. patent application Ser. No. 14/651,381, filed on Jun. 11, 2015, now U.S. Pat. No. 11,003,729, which is a 35 U.S.C. § 371 National Phase Entry Application from International Patent Application No. PCT/CN2012/086422, filed on Dec. 12, 2012, the disclosures of which are incorporated by reference herein in their entirety.

BACKGROUND

The present disclosure relates to providing search results based on a compositional query. Search engines receive search queries from users and provide search results using, for example, a list of text links. Search engines typically solve queries such as [Starbucks near San Francisco Airport] or [Films shot during World War II] by returning a collection of results based on a single, fixed location criterion or on a single, fixed temporal criterion.

SUMMARY

In some implementations, a computer-implemented method comprises determining, using at least one processor, a first entity type, a second entity type, and a relationship based on a compositional query. The computer-implemented method comprises identifying, using at least one processor, nodes of a knowledge graph corresponding to entity references of the first entity type and entity references of the second entity type. The computer-implemented method comprises determining from the knowledge graph, using at least one processor, an attribute value corresponding to the relationship for each entity reference of the first entity type and for each entity reference of the second entity type. The computer-implemented method comprises comparing, using at least one processor, the attribute value of each entity reference of the first entity type with the attribute value of each entity reference of the second entity type. The computer-implemented method comprises determining, using at least one processor, one or more resultant entity references from the entity references of the first entity type based on the comparing. Other implementations of this aspect include corresponding systems configured to perform the actions of the methods.

In some implementations, a computer-implemented method comprises receiving a user input indicating a first entity type, a second entity type, and a relationship between a plurality of entity references of the first entity type and a plurality of entity references of the second entity type that defines a criterion. The computer-implemented method comprises identifying from a knowledge graph a plurality of pairs of entity references of the first entity type and the second entity type that meet the criterion. The computer-implemented method comprises causing to be presented representations of entity references from at least one of the entity references of the first entity type and the entity references of the second entity type from the plurality of pairs. Other implementations of this aspect include corresponding systems configured to perform the actions of the methods.

BRIEF DESCRIPTION OF THE FIGURES

The above and other features of the present disclosure, its nature and various advantages will be more apparent upon consideration of the following detailed description, taken in conjunction with the accompanying drawings in which:

FIG. 2 shows two illustrative data structure representations that may aid in addressing a compositional query in accordance with some implementations of the present disclosure;

DETAILED DESCRIPTION OF THE FIGURES

Figure 1:
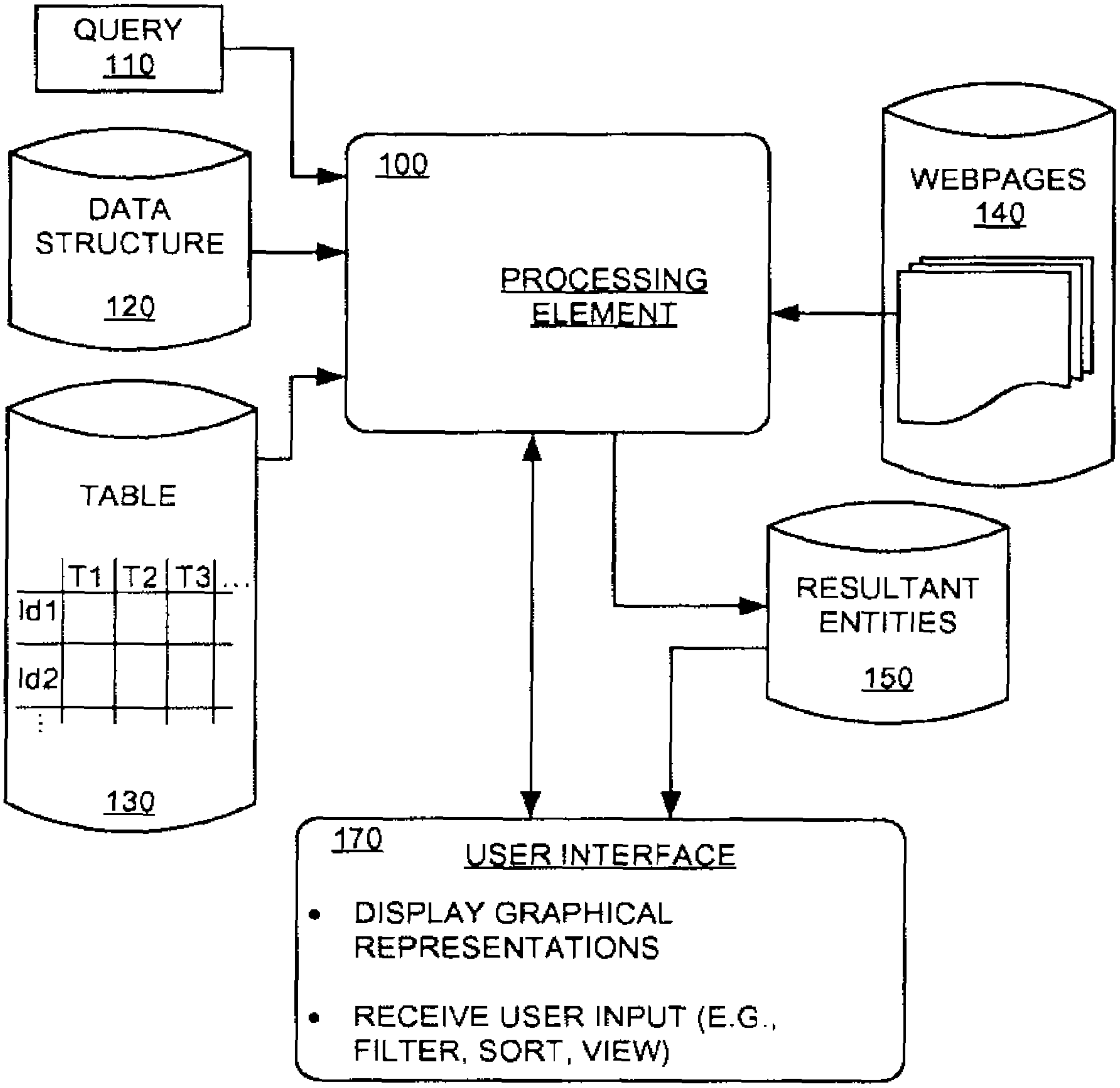
FIG. 1 is a block diagram of an illustrative search system for addressing a compositional query in accordance with some implementations of the present disclosure.

A compositional query is a query that includes at least two types of entity references related by a relative relationship. In some implementations, a compositional query requires the recognition of the at least two types of entity references. As used herein, an entity is a thing or concept that is singular, unique, well-defined, and distinguishable. For example, an entity may be a person, place, item, idea, topic, abstract concept, concrete element, other suitable thing, or any combination thereof. In some implementations, search results include results identifying entity references. As used herein, an entity reference is an identifier, e.g., text, or other information that refers to an entity. For example, an entity may be the physical embodiment of George Washington, while an entity reference is an abstract concept that refers to George Washington. Where appropriate, based on context, it will be understood that the term entity as used herein may correspond to an entity reference, and the term entity reference as used herein may correspond to an entity. In some implementations, the search system may identify an entity type associated with an entity reference. The entity type may be a categorization or classification used to identify entity references in the data structure. For example, the entity reference "George Washington" may be associated with the entity types "U. S. President," "Person," and "Military Officer."

The query [American Banks close to Japanese restaurants] includes references to two types of places, and does not specify any single reference location but rather a relative spatial relationship. The query only indicates that the user wants to get "American bank" results near to a "Japanese restaurant." However, the query does not specify which "Japanese restaurant" is preferred, nor which "American bank is preferred." The likely intention of this query is that the user wants to go to a Japanese restaurant to have a dinner, stopping by an American bank before or after dinner. The user wants search results that include the best candidate or candidates of a Japanese Restaurant or Restaurants and an American Bank or Banks meeting the "close to" criterion. Further discussion regarding entity references and entity types will be included below in the context of FIGS. 3, 4, and 5.

A further example of a compositional query is [Companies that went bankrupt during an economic crisis], in which the relationship is based on time rather than on geographic location. Accordingly, a search system may identify a first entity type, e.g., economic crises, and a second entity type, e.g., companies' bankruptcy filings, and a relationship between the entity types such as, for example, a relative spatial distance or a relative time difference. For example, the search system may determine that the entity types are places, and the relationship is the distance between the places. In a further example, the search system may determine that the entity types are events, and the relationship is the time between events.

Additionally, the search system may filter the set of entity references of one or both types based on the query. Search results may be determined based on comparisons of attributes of entity references of the relevant entity type or entity types. For example, location values or time values may be used to compare two entity references in order to determine if a requisite criterion has been satisfied. These attributes may be stored in any suitable data structure in a way that associates the attributes with their respective entity references. In some implementations, search results include entity references in a data structure, a list of documents, a list of document identifiers, a collection of links, a collection of images, text, or other content, any other suitable results, or any combination thereof.

In some implementations, a pre-generated table may be generated offline and stored, and accessed to aid in identifying resultant entity references to a compositional query. Generating the table offline refers to generating the table prior to responding to any particular query. For example, the table may include a data structure corresponding to an N×M array, where an N×M array has N rows and M columns. The rows correspond to entity references of a particular type such as, for example, restaurants. The columns each correspond to a particular entity type such as, for example, banks, airports, and cafes. For each row related to an entity reference, and each column related to an entity type, of the array, the corresponding entry includes a target entity reference of the entity type determined to be nearest to the entity reference, e.g., based on a comparison of attribute values. The target entity reference is an entity reference of a particular entity type, determined to best fit the criterion. The entry may also include the actual distance, or time if the entities are events, between the entity reference corresponding to the row and the target entity reference. The data structure is generated by comparing each entity reference of each respective type to the entity reference corresponding to each row, and selecting the target entity reference of the respective type that is nearest the entity reference corresponding to the row.

Resultant entity references may be presented to a user via a user interface. The user interface may include a display such as, for example, a map or a timeline, annotated with resultant entity references. The user interface may allow the user to filter the resultant entity references. For example, the user may be provided the option to specify the maximum distance between the entity references of the first type and entity references of the second type to be displayed.

It will be understood that in some implementations, the search system receives compositional queries and identifies resultant entity references related to more than two entity types, for example, three, four, or five. In an example of a compositional query related to three types, the query [American Banks close to Japanese restaurants close to ice cream shops] includes references to three types of places.

FIG. 1 is a block diagram of an illustrative search system for addressing a compositional query in accordance with some implementations of the present disclosure. A search system may include some or all of the components illustrated in FIG. 1. In some implementations, processing element 100 receives query 110 from user input such as, for example, inputting a text query, selecting filter settings, or both. In some implementations, query 110 is received from user interface 170. Processing element 100 may include one or more processors. Processing element 100 may access data structure 120, table 130, content 140, any other suitable information, not shown, or any combination thereof. Data structure 120 includes data pertaining to multiple entity references such as, for example, entity names, attributes, entity types, and inter-entity paths thereof. Table 130 is a data structure, which may include an array indexed by entity and entity type. For example, as illustrated, table 130 is indexed by entity references id1 and id2, and entity types T1, T2, and T3. The entries include target entity references having the type associated with the column that are nearest in distance or time, for example, to the entity reference associated with the row. In some implementations, table 130 is pre-generated and stored for subsequent access by processing element 100 to aid in addressing a compositional query such as, for example, query 110. Processing element 100 may identify a first entity type, a second entity type, and a type of relationship between the entity types. Processing element 100 may determine one or more resultant entity references 150, of the first type, second type, or both, based at least in part on query 110, data structure 120, table 130, webpages 140, any other suitable information, or any combination thereof.

Data structure block 120 includes a data structure including information defined at least in part by the relationships between them. In some implementations, data structure block 120 includes any suitable data structure, data graph, database, index, list, linked list, table, any other suitable information, or any combination thereof. In an example, data structure block 120 includes a collection of data stored as nodes and edges in a graph structure. In some implementations, data structure block 120 includes a knowledge graph. In some implementations, a knowledge graph includes data organized in a graph containing nodes and edges. The data of a knowledge graph may include statements about relationships between entity references, and those statements may be represented as nodes and edges of a graph. The nodes of a knowledge graph each contain a piece or pieces of data and the edges represent relationships between the data contained in the nodes that the edges connect. A particular implementation of a knowledge graph is described below in FIGS. 3-5.

Content block 140 includes stored information from, for example, the internet. In some implementations, webpages block 140 include webpages, hyperlinks, text, images, audio, video, and other suitable content on the internet. In some implementations, content block 140 includes indexed or organized data that is retrieved from the internet. For example, webpages' organized data includes rankings of webpages based on the number of hyperlinks to and from that webpage.

FIG. 2 shows illustrative data structure representations 200 and 250 that may aid in addressing a compositional query in accordance with some implementations of the present disclosure. In some implementations, table 130 of FIG. 1 includes one or more collections of data such as data structure representations 200 or 250. Data structure representations 200 and 250 may be generated and stored for subsequent reference in response to a compositional query. By using a reference such as data structure representations 200 or 250, a search system can reduce the candidate entity reference data size and improve the processing time for responding to a compositional query.

The entries of data structure representation 200 include distances in miles between M particular entity references having identifiers ID 1, ID 2, and so on, and the nearest entity of a particular Type, of N particular types. For example, the distance between entity reference ID M and the nearest entity of Type 3 is 10 miles. Data structure representation 200 may be used, for example, when the entity of a compositional query is explicitly stated or otherwise determinable. A search system can filter possible resultant entity references based on data structure representation 200, and then determine one or more resultant entity references. For example, the "Near" relationship may be defined as being within 30 miles, based on a query. For entity reference ID 2, there are no entity references of Type 2 that are "Near." Accordingly, because the nearest entity of Type 2 to entity reference ID 2 is 40 miles, the search system may discard the entity reference ID 2 in the context of determining resultant entity references. However, for entity reference ID 1, the search system may find an entity of Type 2 that meets the "Near" criterion, and accordingly the search system may determine resultant entity references only for entity reference ID 1.

The entries of data structure representation 250 include distances between M particular entity references having identifiers ID 1, ID 2, and so on, and the nearest entity of a particular Type, of N particular types, as well as entity identifiers for the nearest entity of each type. For example, for a given entity reference ID 1, the search system can look up the nearest entity of Type 2, which is ID_b1, and the distance between entity references ID 1 and ID_b1, which is 20 miles. In an illustrative example, let entity reference ID 1 be a particular Starbucks restaurant and let Type 2 be "Airport." The search system can determine whether there is an airport near to a Starbucks restaurant, and also which airport that is. For a query of the type [Starbucks near airports], the restaurant is restricted to be Starbucks, but the airport does not have any restriction. A reference such as data structure representation 250 may be especially useful in response to a compositional query having a restriction on only one of the entity references. In some implementations, data structure representation 250 may be generated by modifying data structure representation 200 to include entity identifiers in the entries.

The entity reference, entity type, and relationship information described above, which may be used to generate tables or provide search results for example, may be included as data in a data structure. The following description and accompanying FIGS. 3-5 describe an illustrative knowledge graph that may be used with some implementations of the present disclosure. It will be understood that the knowledge graph is merely an example of a data structure that may be used by the search system, and that any suitable data structure may be used.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, undirected, or both. For example, edges may be unidirectional, bidirectional, or one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be useful for representing information and in providing information in search.

Figure 3:
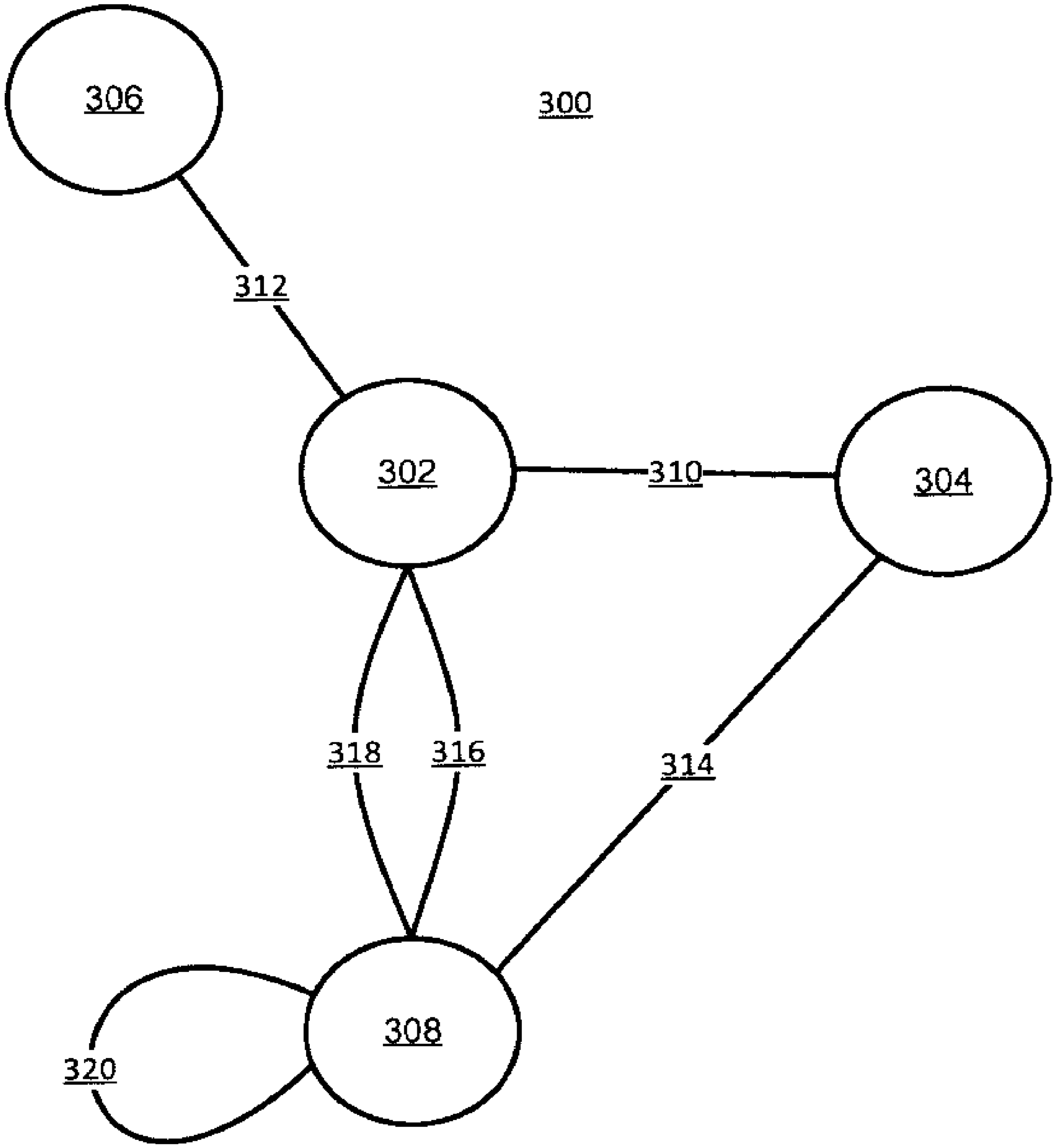
FIG. 3 shows an illustrative knowledge graph containing nodes and edges in accordance with some implementations of the present disclosure.

FIG. 3 shows illustrative knowledge graph portion 300 containing nodes and edges in accordance with some implementations of the present disclosure. Illustrative knowledge graph portion 300 includes nodes 302, 304, 306, and 308. Knowledge graph portion 300 includes edge 310 connecting node 302 and node 304. Knowledge graph portion 300 includes edge 312 connecting node 302 and node 306. Knowledge graph portion 300 includes edge 314 connecting node 304 and node 308. Knowledge graph portion 300 includes edge 316 and edge 318 connecting node 302 and node 308. Knowledge graph 300 includes edge 320 connecting node 308 to itself. Each aforementioned group of an edge and one or two distinct nodes may be referred to as a triple or 3-tuple. As illustrated, node 302 is directly connected by edges to three other nodes, while nodes 304 and 308 are directly connected by edges to two other nodes. Node 306 is connected by an edge to only one other node, and in some implementations, node 306 is referred to as a terminal node. As illustrated, nodes 302 and 308 are connected by two edges, indicating that the relationship between the nodes is defined by more than one property. As illustrated, node 308 is connected by edge 320 to itself, indicating that a node may relate to itself. While illustrative knowledge graph portion 300 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entity references, organizational data such as entity types and properties, literal values, and models of relationships between other nodes.

In some implementations, entity references, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that term may be added. In another example, a user may manually add information and organizational structures.

A node of a knowledge graph may represent an entity. An entity is a thing or concept that is singular, unique, well-defined and distinguishable. For example, an entity may be a person, place, item, idea, abstract concept, concrete element, other suitable thing, or any combination thereof. It will be understood that in some implementations, the knowledge graph contains an entity reference, and not the physical embodiment of the entity. For example, an entity may be the physical embodiment of George Washington, while an entity reference is an abstract concept that refers to George Washington. In another example, the entity "New York City" refers to the physical city, and the knowledge graph uses a concept of the physical city as represented by, for example, an element in a data structure, the name of the entity, any other suitable element, or any combination thereof. Where appropriate, based on context, it will be understood that the term entity as used herein may correspond to an entity reference, and the term entity reference as used herein may correspond to an entity.

Nodes are unique, in that no two nodes refer to the same thing or concept. Generally, entities include things or concepts represented linguistically by nouns. For example, the color "Blue," the city "San Francisco," and the imaginary animal "Unicorn" may each be entities. An entity reference generally refers to the concept of the entity. For example, the entity reference "New York City" refers to the physical city, and the knowledge graph uses a concept of the physical city as represented by, for example, an element in a data structure, the name of the entity, any other suitable element, or any combination thereof.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity reference node X by an "Is A" edge or link, discussed further below, such that the graph represents the information "The Entity X Is Type Y." For example, the entity reference node "George Washington" may be connected to the entity type node "President." An entity reference node may be connected to multiple entity type nodes, for example, "George Washington" may also be connected to entity type node "Person" and to entity type node "Military Commander." In another example, the entity type node "City" may be connected to entity reference nodes "New York City" and "San Francisco." In another example, the concept "Tall People," although incompletely defined, e.g., the knowledge graph does not necessarily include a definition of "tall," may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entity references are associated with types in more than one domain. For example, the entity reference node "Benjamin Franklin" may be connected with the entity type node "Politician" in the domain "Government" as well as the entity type node "Inventor" in the domain "Business".

In some implementations, properties associated with entity reference nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity reference node "Knowledge Graph" that is connected to property nodes that describe a knowledge graph's properties such as "Has Nodes" and "Has Edges."

Specific values, in some implementations referred to as literals, may be associated with a particular entity reference in a terminal node by an edge defining the relationship. Literals may refer to values and/or strings of information. For example, literals may include dates, names, and/or numbers. In an example, the entity reference node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entity references. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected to entity reference nodes X, Y, and Z, where each edge identifies the role of each respective connected entity reference node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the search system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington," "President Washington," and "President George Washington" may all be associated with a single entity reference, e.g., a node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity reference node related to the city "Philadelphia," an entity reference node related to the movie "Philadelphia," and an entity reference node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated entity types, by other entity references connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity reference node may include or connect to: a unique identification reference, a list of entity types associated with the node, a list of differentiation aliases for the node, data associated with the entity reference, a textual description of the entity reference, links to a textual description of the entity reference, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity reference node of a particular person may be connected by a "Date Of Birth" edge to a terminal node containing a literal of his or her specific date of birth. In some implementations, the properties defined by edge connections of an entity reference may relate to nodes connected to the type of that entity reference. For example, the entity type node "Movie" may be connected to entity reference nodes "Actor" and "Director," and a particular movie may be connected by an edge property "Has Actor" to an entity reference node representing a particular actor.

In some implementations, nodes and edges define the relationship between an entity type node and its properties, thus defining a schema. For example, an edge may connect an entity type node to a node associated with a property, which may be referred to as a property node. Entity references of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity reference node "George Washington," which is connected to entity type node "Person" by an "Is A" edge, may also be connected to a literal "Feb. 22, 1732" by the edge "Has Date Of Birth." In some implementations, the entity reference node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity reference node "George Washington" may be connected by an "Is A" edge to the entity type node representing "Person," thus indicating an entity type of the entity reference, and may also be connected to a literal "Feb. 22, 1732" by the edge "Has Date Of Birth," thus defining a property of the entity reference. In this way, the knowledge graph defines both entity types and properties associated with a particular entity reference by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entity references, any other suitable arrangement, or any combination thereof.

Figure 4:
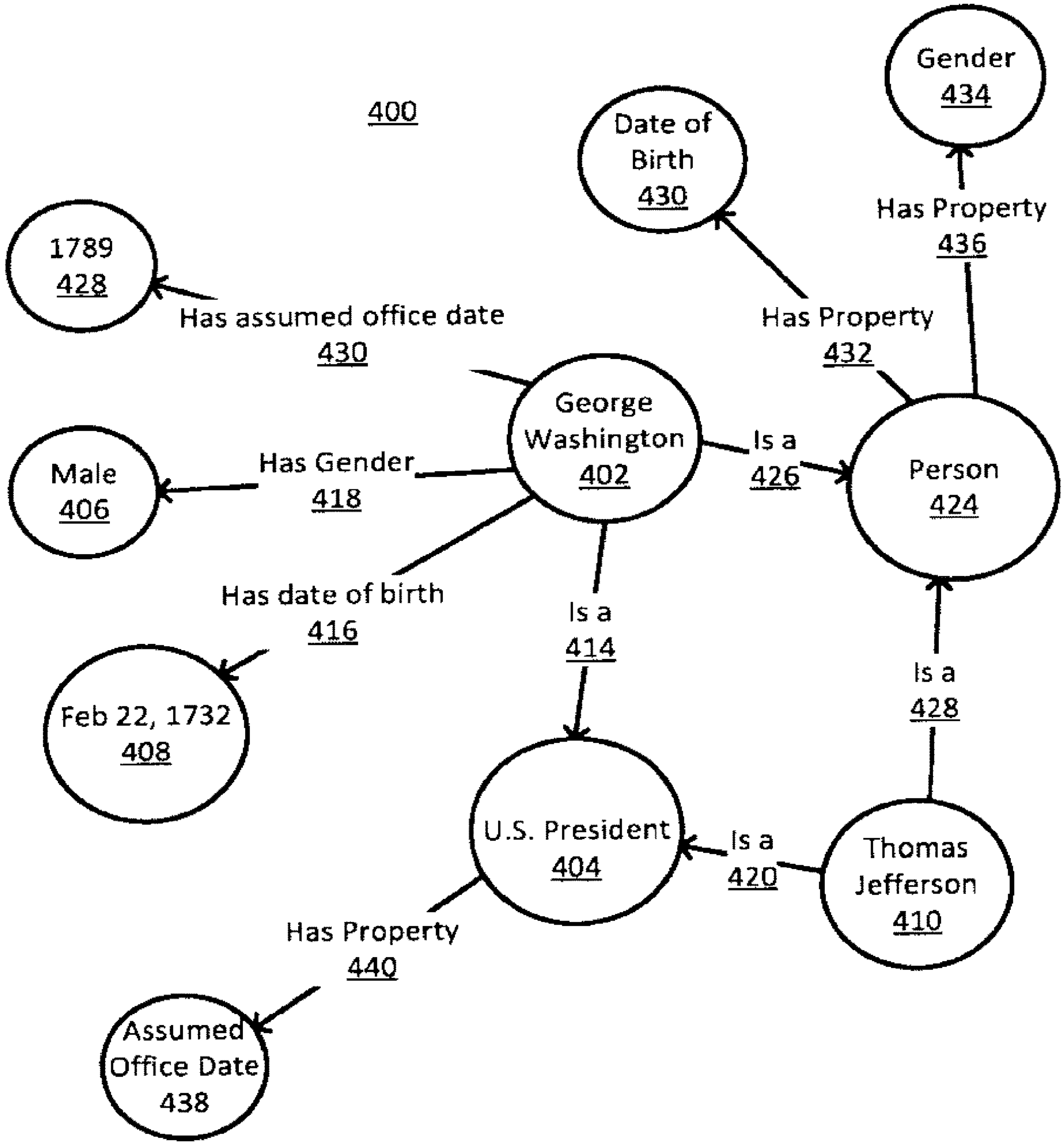
FIG. 4 shows an illustrative knowledge graph portion in accordance with some implementations of the present disclosure.

FIG. 4 shows an illustrative knowledge graph portion 400 in accordance with some implementations of the present disclosure. Knowledge graph portion 400 includes information related to the entity reference "George Washington," represented by "George Washington" node 402. "George Washington" node 402 is connected to "U.S. President" entity type node 404 by "Is A" edge 414 with the semantic content "Is A," such that the 3-tuple defined by nodes 402 and 404 and the edge 414 contains the information "George Washington is a U.S. President." Similarly, the information "Thomas Jefferson Is A U.S. President" is represented by the tuple of "Thomas Jefferson" node 410, "Is A" edge 420, and "U.S. President" node 404. Knowledge graph portion 400 includes entity type nodes "Person" 424, and "U.S. President" node 404. The person type is defined in part by the connections from "Person" node 424. For example, the type "Person" is defined as having the property "Date Of Birth" by node 430 and edge 432, and is defined as having the property "Gender" by node 434 and edge 436. These relationships define in part a schema associated with the entity type "Person."

"George Washington" node 402 is shown in knowledge graph portion 400 to be of the entity types "Person" and "U.S. President," and thus is connected to nodes containing values associated with those types. For example, "George Washington" node 402 is connected by "Has Gender" edge 418 to "Male" node 406, thus indicating that "George Washington has gender "Male." Further, "Male" node 406 may be connected to the "Gender" node 434 indicating that "Male Is A Type Of Gender." Similarly, "George Washington" node 402 is connected by "Has Date of Birth" edge 416 to "Feb. 22, 1732" node 408, thus indicating that "George Washington Has Date Of Birth Feb. 22, 1732." "George Washington" node 402 may also be connected to "1789" node 428 by "Has Assumed Office Date" edge 430.

Knowledge graph portion 400 also includes "Thomas Jefferson" node 410, connected by "Is A" edge 420 to entity type "U.S. President" node 404 and by "Is A" edge 428 to "Person" entity type node 424. Thus, knowledge graph portion 400 indicates that "Thomas Jefferson" has the entity types "U.S. President" and "Person." In some implementations, "Thomas Jefferson" node 410 is connected to nodes not shown in FIG. 4 referencing his date of birth, gender, and assumed office date.

It will be understood that knowledge graph portion 400 is merely an example and that it may include nodes and edges not shown. For example, "U.S. President" node 404 may be connected to all of the U.S. Presidents. "U.S. President" node 404 may also be connected to properties related to the entity type such as a duration of term, for example "4 Years," a term limit, for example "2 Terms," a location of office, for example "Washington D.C.," any other suitable data, or any combination thereof. For example, "U.S. President" node 404 is connected to "Assumed Office Date" node 438 by "Has Property" edge 440, defining in part a schema for the type "U.S. President." Similarly, "Thomas Jefferson" node 410 may be connected to any suitable number of nodes containing further information related to his illustrated entity type nodes "U.S. President," and "Person," and to other entity type nodes not shown such as "Inventor," "Vice President," and "Author." In a further example, "Person" node 424 may be connected to all entity references in the knowledge graph with the type "Person." In a further example, "1789" node 428 may be connected to all event references in the knowledge graph with the property of year "1789." "1789" node 428 is unique to the year 1789, and disambiguated from, for example, a book entitled "1789," not shown in FIG. 4, by its unique identification reference. In some implementations, "1789" node 428 is connected to the entity type node "Year."

Figure 5:
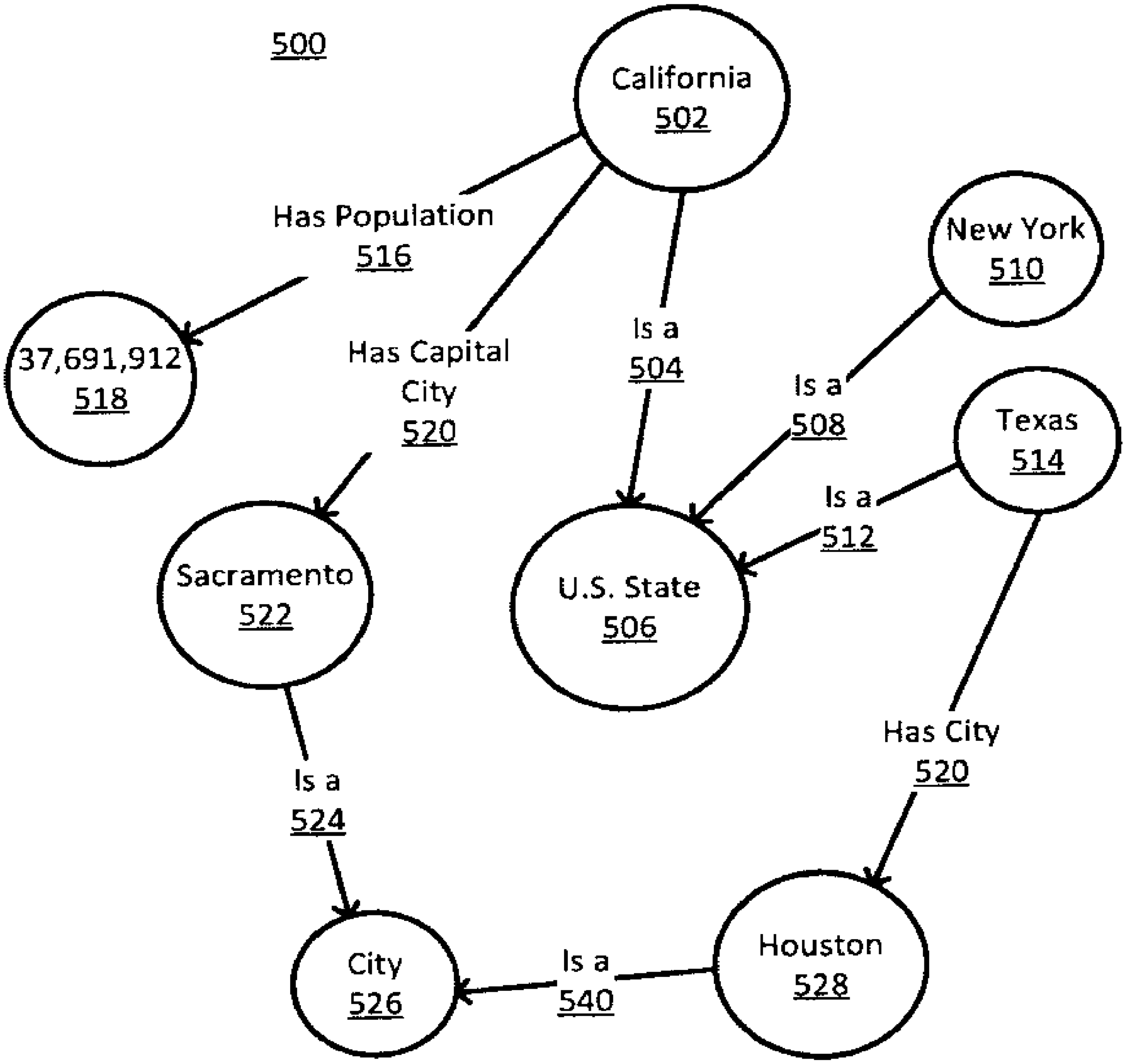
FIG. 5 shows another illustrative knowledge graph portion in accordance with some implementations of the present disclosure.

FIG. 5 shows another illustrative knowledge graph portion 500 in accordance with some implementations of the present disclosure. Knowledge graph portion 500 includes "California" node 502, which may also be associated with differentiation aliases such as, for example, "CA," "Calif.," "Golden State," any other suitable differentiation aliases, or any combination thereof. In some implementations, these differentiations are stored in "California" node 502. California is connected by "Is A" edge 504 to the "U.S. State" entity type node 506. "New York" node 510 and "Texas" node 514 are also connected to "U.S. State" node 506 by "Is A" edges 508 and 512, respectively. "California" node 502 is connected by "Has Capital City" edge 520 to "Sacramento" node 522, indicating the information that "California Has Capital City Sacramento." Sacramento node 522 is further connected by "Is A" edge 524 to the "City" entity type node 526. Similarly, "Texas" node 514 is connected by "Has City" edge 520 to "Houston" node 528, which is further connected to the "City" entity type node 526 by "Is A" edge 540. "California" node 502 is connected by "Has Population" edge 516 to node 518 containing the literal value "37,691,912." In an example, the particular value "37,691,912" may be periodically automatically updated by the knowledge graph based on an external website or other source of data. Knowledge graph portion 500 may include other nodes not shown. For example, "U.S. State" entity type node 506 may be connected to nodes defining properties of that type such as "Population" and "Capital City." These type-property relationships may be used to define other relationships in knowledge graph portion 500 such as "Has Population" edge 516 connecting entity reference node "California" 516 with terminal node 518 containing the literal defining the population of California.

It will be understood that while knowledge graph portion 400 of FIG. 4 and knowledge graph portion 500 of FIG. 5 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entity references and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 6:
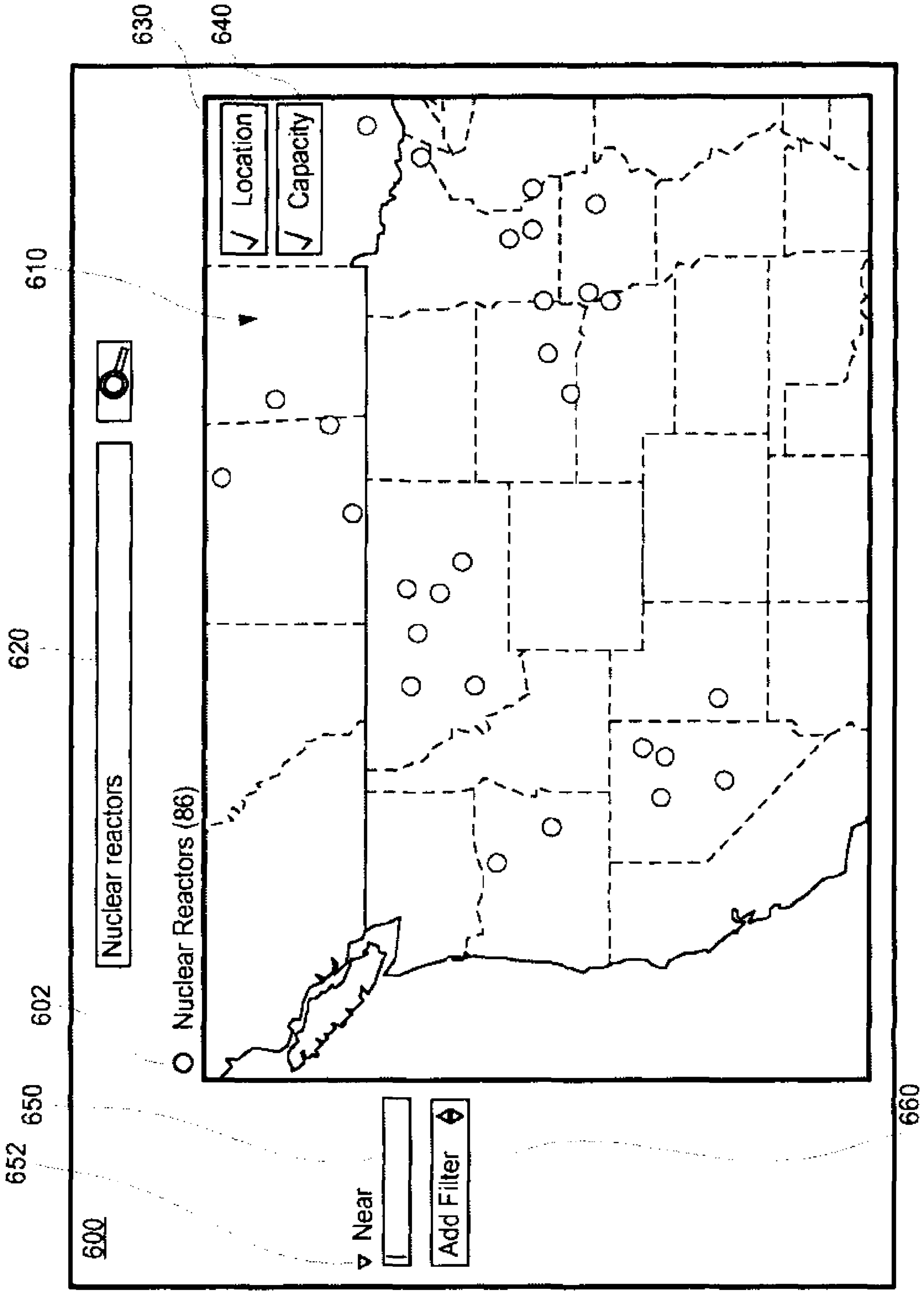
FIG. 6 is an illustrative first screenshot of a user interface of the search system in accordance with some implementations of the present disclosure.
Figure 7:
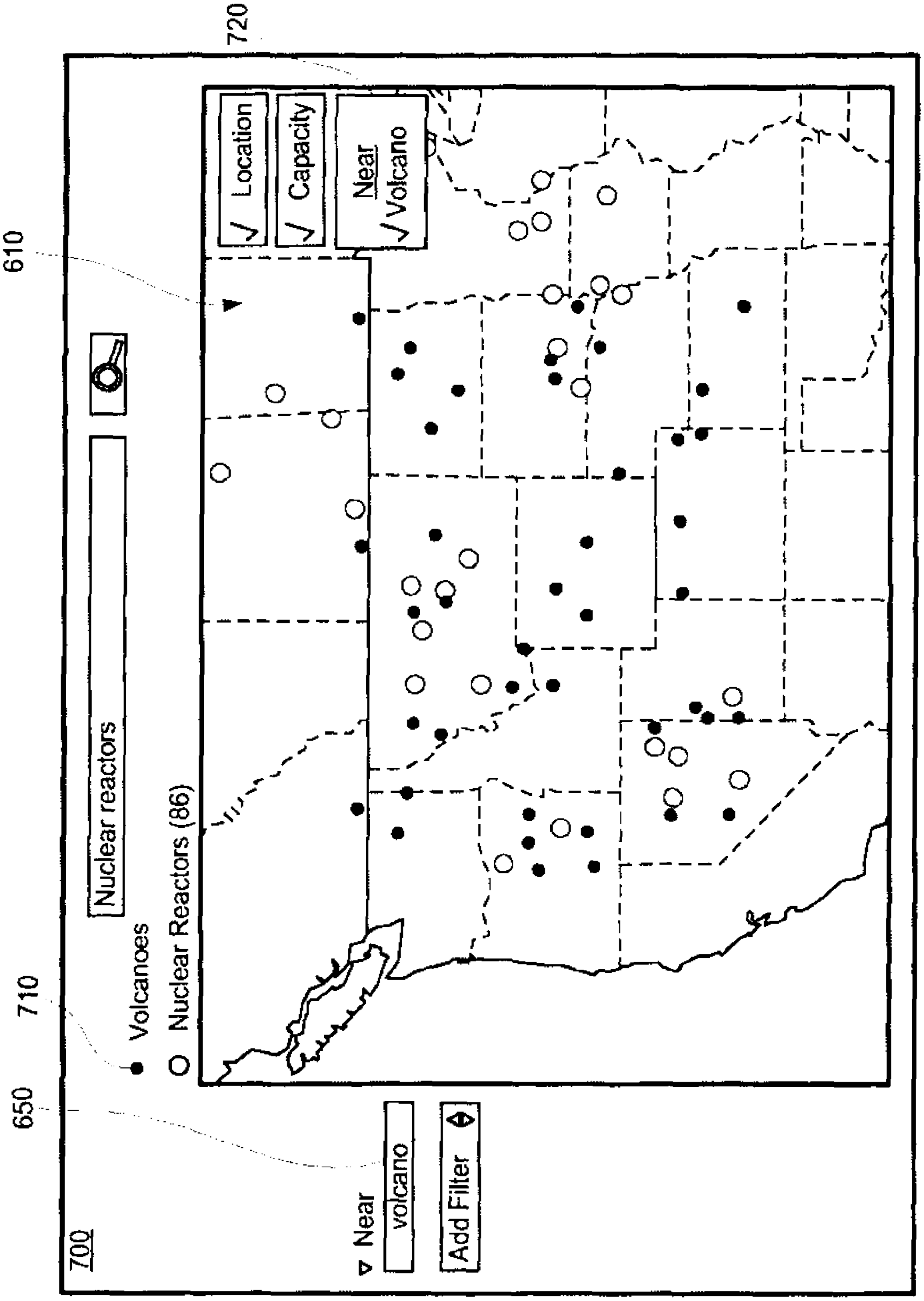
FIG. 7 is an illustrative second screenshot of a user interface of the search system in accordance with some implementations of the present disclosure.
Figure 8:
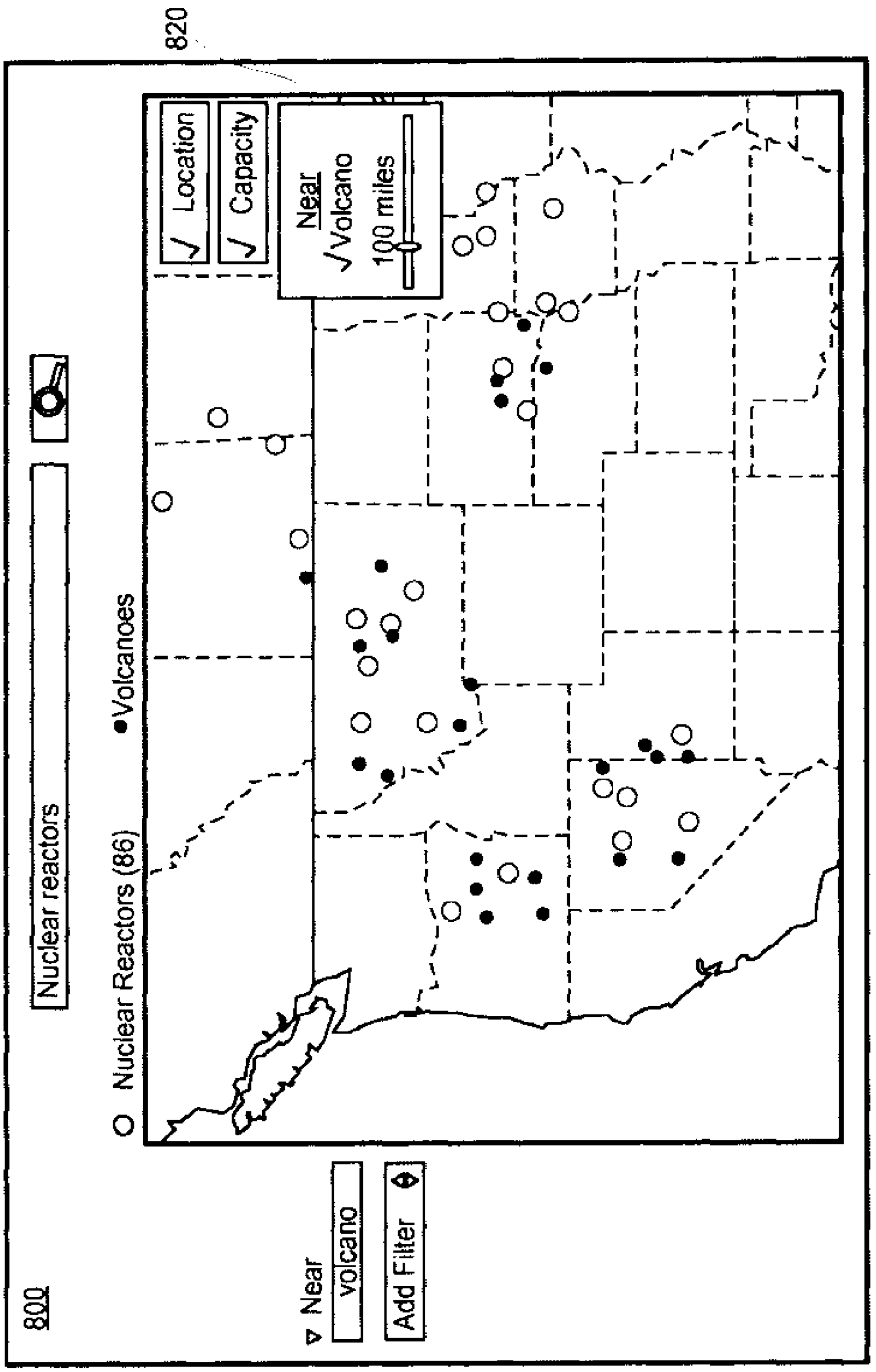
FIG. 8 is an illustrative third screenshot of a user interface of the search system in accordance with some implementations of the present disclosure.

FIGS. 6-8 show illustrative, successive screenshots of a user interface, based on an illustrative query [nuclear reactors near volcanoes].

FIG. 6 is an illustrative first screenshot 600 of a user interface of a search system in accordance with some implementations of the present disclosure. Screenshot 600 includes a map 610 of a portion of the United States and Canada, with nuclear reactors 602 annotated by open circles. A first text query [Nuclear reactors] is shown in text box 620. "Nuclear reactors" is the first entity type of the query in the illustrated example of FIGS. 6, 7, and 8. Nuclear reactors 602 includes a collection of entity references stored in a data structure such as a knowledge graph, where each respective entity reference is associated with a location, illustrated by indicator 630, and associated with a minimum power capacity, indicated by indicator 640. Indicators 630 and 640 represent settings that pertain to the display such as, for example, display settings or filter settings. For example, the displayed nuclear reactors 602 may be filtered by location, capacity, or other metric, e.g., as shown by filter menu 660, or a combination thereof. The graphical representations may also indicate one or more criteria, e.g., the open circles may be sized by nuclear reactor capacity. The search system may determine geographic information for each nuclear reactor in order to annotate map 610 with the open circles, in response to the query [Nuclear reactors]. For example, the geographic information includes latitude and longitude values included in a geography property associated with each considered nuclear reactor entity reference in the knowledge graph. In a further example, a knowledge graph may include geographic information for entities referenced therein.

FIG. 7 is an illustrative second screenshot 700 of a user interface of the search system in accordance with some implementations of the present disclosure. Screen shot 700 is subsequent to screen shot 600, and shows the additional query [Near volcano], as entered in the "Near" text box 650. In some implementations, menu 652 is available to allow the user to select what relationship is desired. For example, in addition to "Near," menu 652 can include "Far," "Between X and Y miles of," or any other suitable selectable relationship options. Volcanoes 710 are shown as black dots on map 610. "Volcanoes" indicates a second entity type in the illustrated example of FIGS. 6, 7, and 8. The search system may interpret the criterion "Near" of the query to mean "Within a predetermined distance of," based on the relationship of the first and second entity types being spatial, e.g., the entities are all places each having a location. Accordingly, each of volcanoes 710 shown in screenshot 700 are within some predetermined distance, e.g., unspecified but greater than 200 miles, of one or more of nuclear reactors 610. The volcanoes and nuclear reactors shown in screenshot 700 satisfy the query [Nuclear reactors and nearby volcanoes].

FIG. 8 is an illustrative third screenshot 800 of a user interface of the search system in accordance with some implementations of the present disclosure. Screen shot 800 is subsequent to screen shot 700, and shows the additional query [Within 100 miles], as entered using filter menu 660. Indicator 820 displays the criterion [Within 100 miles], along with a user-adjustable slide bar that may be used to filter the displayed volcano results. Accordingly, only volcanoes within 100 miles of a nuclear reactor are displayed. The volcanoes and nuclear reactors shown in screenshot 800 satisfy the query [Nuclear reactors and volcanoes within 100 miles]. Screenshots 600, 700, and 800 of FIGS. 6, 7 and 8, respectively, illustrate a user interaction to refine one collection of results by another collection of results, and allow the user to define one or more criteria, e.g., the distance on a map view. Accordingly, the search system can apply other refinements, to narrow the search results and identify the best pair of entity references, or larger group of entity references, based on, for example, user input, data in a knowledge graph, shared properties, aggregated user selections, any other information, or any combination thereof.

Figure 9:
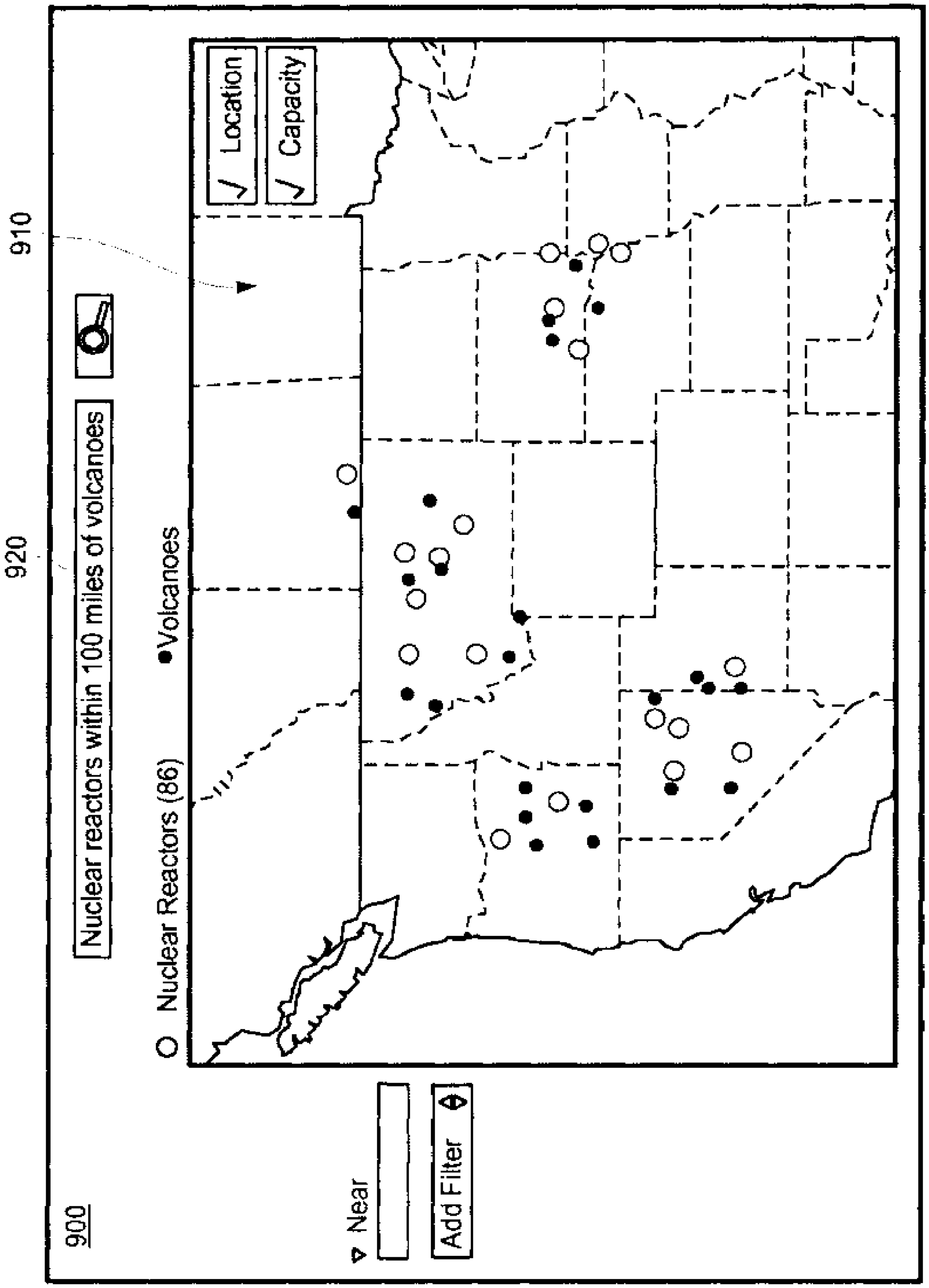
FIG. 9 is a further illustrative screenshot of a user interface of the search system in accordance with some implementations of the present disclosure.

FIG. 9 is further illustrative screenshot 900 of a user interface of the search system in accordance with some implementations of the present disclosure. Screenshot 900 includes map 910 of a portion of the United States and Canada, with nuclear reactors 902 annotated by open circles, and volcanoes 904 annotated by black dots. Original text query [Nuclear reactors within 100 miles of volcanoes] is shown in text box 920. The volcanoes and nuclear reactors shown in screenshot 900 satisfy the query [Nuclear reactors within 100 miles of volcanoes]. "Nuclear reactors" indicates a first entity type, "Volcanoes" indicates a second entity type, and "Within 100 miles" indicates a criterion, in the illustrated example of FIG. 9. Note that screenshot 900 displays filtered results for both entity references of the first type and second type, while screenshot 800 of FIG. 8 displayed entity references of the first type with only entity references of the second type being filtered. In accordance with the present disclosure, the search system may filter entity references of one or both, or more than two, types. Also, in accordance with the present disclosure, the search system may display entity references of one or both, or more than two, types. For example, referencing FIG. 9, the search system may optionally only display nuclear reactors 902 that meet the criterion, not shown.

Figure 10:
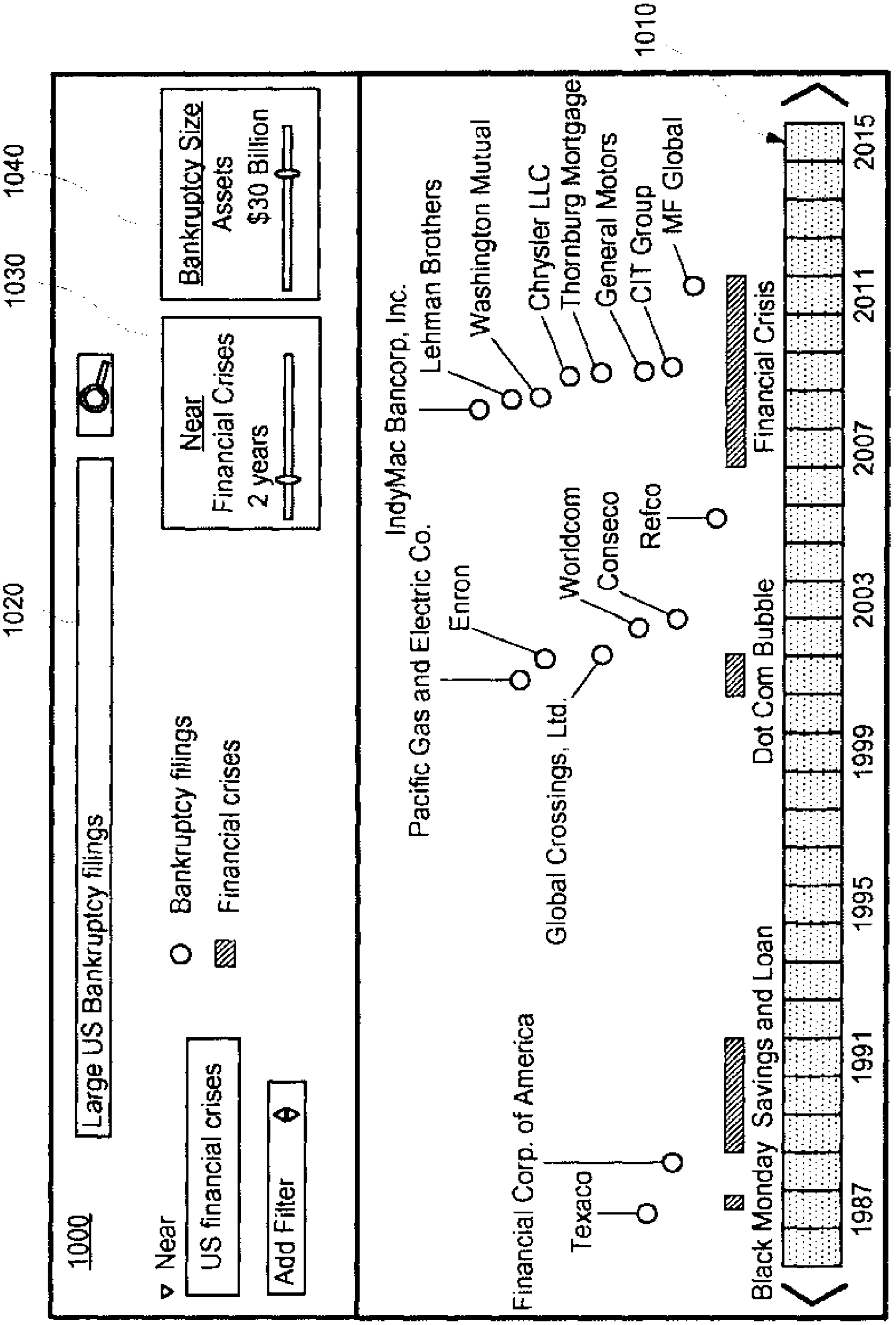
FIG. 10 is an illustrative screenshot of a user interface of the search system, showing a timeline in accordance with some implementations of the present disclosure.

Similar techniques such as those described in the context of FIGS. 6, 7, 8, and 9 may be applied to entity types having a time relationship. FIG. 10 is an illustrative screenshot 1000 of a user interface of the search system, showing a timeline 1010 in accordance with some implementations of the present disclosure. Screenshot 1000 includes a timeline 1010 of dates ranging from 1986 to 2015, with bankruptcy filings 1002 annotated by open circles, and US financial crises 1004 annotated by hatched boxes. Four US financial crises are displayed in screenshot 1000, along with sixteen bankruptcy filings, satisfying the query [US bankruptcy filings of companies with over $30 billion in assets within 2 years of US financial crises]. Accordingly, entity references of the first entity type, bankruptcy filings in the illustrated example, are filtered by company size, and proximity to a financial crisis, while entity references of the second type, US financial crises in the illustrated example, are not substantially filtered. In some implementations, the search system may determine which types of entity references, if any, are to be filtered and/or displayed. For example, the search system may display only bankruptcy filings 1002 on timeline 1010, without displaying US financial crises 1004. The determination by the search system of which entity references to filter and/or display may be based on a query, a predetermined setting, the types of entity references under consideration, any other suitable information, or any combination thereof. Indicators 1030 and 1040 display filtering criteria, which may be adjusted, respectively, by user interaction with the respective slide bars. The determination of indicators to display may be based on a query, a predetermined setting, types of entity references under consideration, any other suitable information, or any combination thereof. For example, if the user adjusted the slide bar of indicator 1030 to a filter setting of [1 year], the search system may remove the "Refco" bankruptcy filing from screenshot 1000 because it is not within one year of a US financial crisis.

Figure 11:
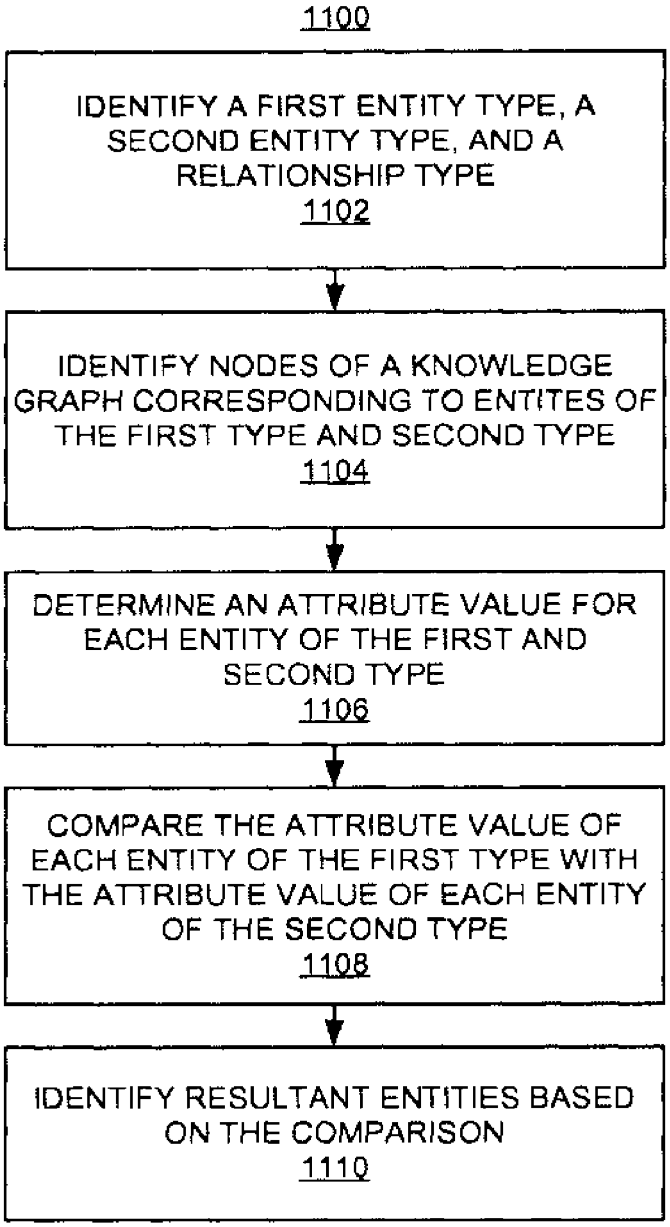
FIG. 11 is a flow diagram of illustrative steps for identifying resultant entity references based on a compositional query in accordance with some implementations of the present disclosure.

FIG. 11 is a flow diagram 1100 of illustrative steps for identifying resultant entity references based on a compositional query in accordance with some implementations of the present disclosure. The illustrative steps of flow diagram 1100 may be rearranged, omitted, or otherwise altered in accordance with some implementations of the present disclosure. It will be understood that while flow diagram 1100 illustrates steps for a first entity type and a second entity type, in some implementations the search system processes any suitable number of entity types.

Step 1102 is the search system identifying a first entity type, a second entity type, and a relationship. In some implementations, the first entity type, the second entity type, and their relationship may be identified from a query. In some circumstances, the first entity type and second entity type are both entity types having location properties. For example, the entity types may be restaurants, banks, buildings, offices, bars, cafes, gas stations, casinos, department stores, stadiums, libraries, National Parks, lakes, nuclear reactors, volcanoes, any other suitable entity type having a location attribute, which may be filtered or limited by any suitable criterion, e.g., restaurants limited to Japanese restaurants, or any combination thereof. In some circumstances, the first entity type and second entity type are both entity types having time attributes. For example, the entity types may be birthdays, deaths, lifespans, wars, financial crises, inaugurations, tenures, filings, e.g., bankruptcy filings, airing date, e.g., of a television program, any other suitable event, any other suitable entity type having a time attribute, filtered or limited by any suitable criterion, e.g., US presidents' birthdates, or any combination thereof. Relationships between entities may include any suitable attribute values that may be compared such as, for example, building heights, animal genus/species classification, automobile specifications, spousal income, any other attribute which may be compared between entities, or any combination thereof. For example, a query such as [Husbands and wives having an income gap of more than 1 million dollars] may be addressed by comparing attribute values of "income." In a further example, a query such as [close buildings in New York having a height difference of at least 500 feet] may be addressed by comparing attribute values of building height. In the previous example, the search system may also compare attribute values of location based on the "close" criterion, thus providing search results based on two sets of attribute values, e.g., building height and location.

Step 1104 is the search system identifying nodes of a knowledge graph corresponding to entity references of the first entity type and entity references of the second entity type. For example, the first entity type may be "US financial crises," and the search system may identify nodes in the knowledge graph corresponding to Black Monday, Savings and Loan Crisis, Dot Com Bubble, and 2007 Housing Bubble.

Step 1106 is the search system determining an attribute value for each entity reference of the first entity type and each entity reference of the second entity type. For example, the search system may determine the attribute values by searching the knowledge graph and accessing the relevant nodes. In some implementations, the attribute value may include position information such as an address, a longitude/latitude value, a relative position referenced to another entity, any other suitable position information, or any combination thereof. In some implementations, the attribute may include temporal information such as a date, a time of day, a year, a century, a relative time interval referenced to another entity, any other suitable temporal information, or any combination thereof. The attribute value may be a number, text, an alphanumeric string, or have any other format.

Step 1108 is the search system comparing the attribute value of each entity of the first entity type with the attribute value of each entity of the second entity type. For example, for N entity references of the first type and M entity references of the second type, the search system may perform N×M comparisons. In some implementations, the search system may compare entity references by determining the difference in their respective attribute values. For example, for two entity references having position attribute values, the search system may determine a relative distance, in any suitable units, between the entity references. In a further example, for two entity references having temporal attribute values, the search system may determine a relative time interval, in any suitable units, between the entity references. It will be understood that the attribute value the search system identifies and compares may depend on the compositional query, and that a particular entity reference can have associated attributes that include both position and temporal information. In some implementations, the search system may bypass some of the N×M comparisons based on a reference table such as that shown in FIG. 2. For example, if the reference table indicates that for a particular entity reference of the first entity type, there are no entity references of the second entity type that fit the criterion, the search system need not perform the comparison, which accordingly reduces computing time.

Step 1110 is the search system identifying one or more resultant entity references based on the comparison of step 1108. The resultant entity references include a subset of the collective entity references of the first entity type and second entity type. In some implementations, the resultant entity references may only include entity references of either the first entity type or second entity type. For example, in response to the compositional query [American banks close to Japanese restaurants], the search system may only select "American banks" as resultant entity references. In some implementations, the search system may select the resultant entity references based on a criterion. The criterion may be explicitly included in the query, implied by the query, or determined by the search system based on predetermined settings.

In an illustrative example, the search system identifies resultant entity references having location attributes. The search system calculates the latitude and longitude for all the geography entity references in the knowledge graph. Some entity references themselves have geography attributes such as, for example, Mount Everest, while other entity references do not. For example, the entity reference of "Google office in New York" may have an attribute called "location," which may be a building. The building itself may contain a geography location attribute, e.g., a latitude and longitude. The search system generates a data structure including an identifier, e.g., identification number corresponding to each respective entity reference, and a location, e.g., latitude and longitude, for each entity reference in the knowledge graph. The identifier is the entity-unique ID which indexes the entity data in the data structure. In some implementations, a hash map is used to store the identification and location data. Accordingly, given an ID, the search system can typically retrieve the corresponding latitude and longitude in O(1) time. As the search system receives a query, the system recognizes two entity types in the query and identifies entity references of the two entity types. Using the ID and location, the search system identifies the latitude and longitude for all of the entity references. By calculating the distance between each entity reference of the first entity type and each entity reference of the second entity type, the search system determines which pairs of entities are near to each other, based on a distance criterion, which is, for example, specified by the user, or predetermined by the search system. For entity references having time attributes, the search system calculates the difference in time and determines which pairs of entities are near to each other, based on a time criterion, which is, for example, specified by the user, or predetermined by the search system. In some implementations, the time complexity of the disclosed algorithm is O(N*M), where N is the number of entity references of the first entity type, and M is the number of entity references of the second entity type.

Figure 12:
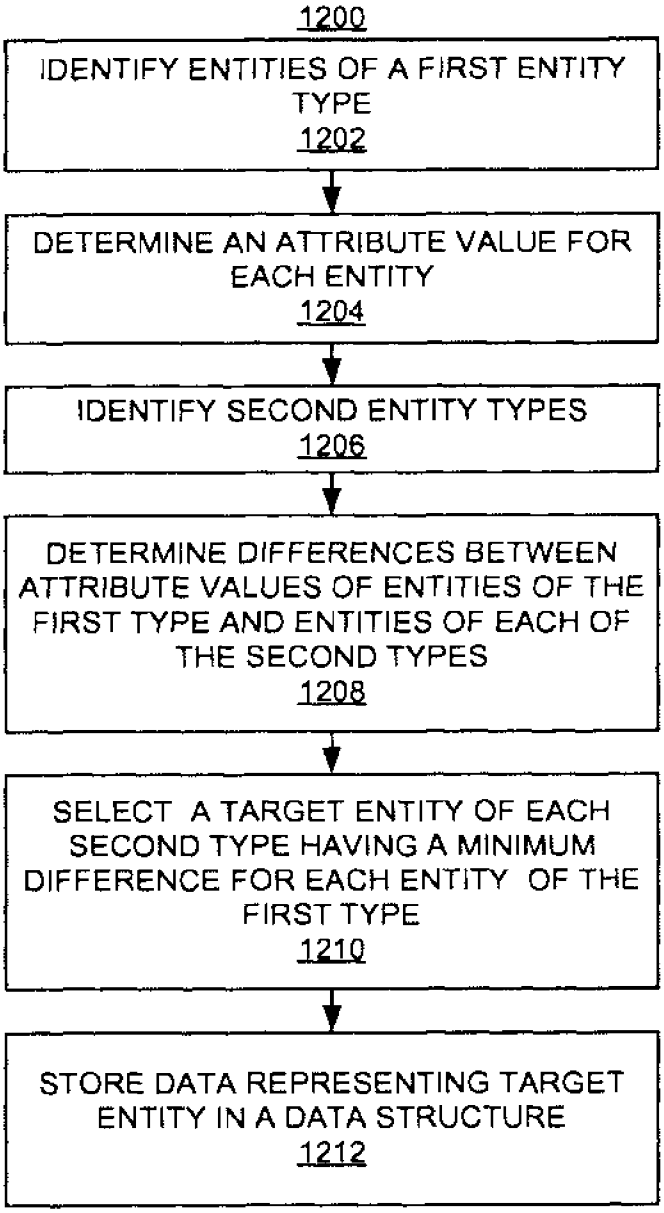
FIG. 12 is a flow diagram of illustrative steps for storing data in a data structure for use with a compositional query in accordance with some implementations of the present disclosure.

FIG. 12 is a flow diagram 1200 of illustrative steps for storing data in a data structure for use with a compositional query in accordance with some implementations of the present disclosure. In some circumstances, the search system may identify many entity references in each entity type, e.g., 10,000 entity references or more, which incurs a relatively larger time complexity. In such circumstances, the search system would need to run 10,000*10,000, thus 100,000,000, distance calculations, or more, and then compare with one another to find the best pairs. In order to reduce computation time, a pre-generated data structure may be used. In some implementations, the search system may perform the illustrative steps of flow diagram 1200 without regard to a particular query such as, for example, when executed as an offline algorithm. The search system can generate the table offline and identify the results relatively quickly. In some implementations, the search system can only restrict one entity type in the query. For example, referencing the type "Airport," the data structure could include the airports in California, because the data are built prior to responding to a particular query. The illustrative steps of flow diagram 1200 may be rearranged, omitted, or otherwise altered in accordance with some implementations of the present disclosure. It will be understood that while flow diagram 1200 illustrates steps for a first entity type and a second entity type, in some implementations the search system processes any suitable number of entity types.

Step 1202 is the search system identifying entity references of a first entity type. The search system identifies the entity references of the first entity type by searching a knowledge graph. The first entity type may be, for example, determined by the search system or determined by a user.

Step 1204 is the search system determining an attribute value for each entity reference of the first entity type identified at step 1202. The attribute value may include position information, temporal information, any other suitable information, or any combination thereof. The attribute may be, for example, determined by the search system or determined by a user.

Step 1206 is the search system identifying entity references of multiple second entity types. The second entity type may be determined by the search system or determined by a user. In some implementations, the multiple second entity types are determined based on search histories such as the most popular entity types searched. In some implementations, the multiple second entity types are determined based on their practical relationship with the first entity type. For example, for a first entity type of "Airport," the multiple second entity types may include "Hotels," "Restaurants," "Tourist sights," and "Convention centers."

Step 1208 is the search system determining differences between the attribute values of each entity reference of the first entity type and each entity reference of the second entity type. The differences may be distances, time intervals, any other suitable differences, or any combination thereof.

Step 1210 is the search system selecting a target entity reference of each second entity type for each entity reference of the first entity type having a minimum difference as determined at step 1208. In some implementations, the search system identifies these nearest pairs by entity reference, entity type, or both.

Step 1212 is the search system storing data representing the target entity reference of each second entity type in a data structure. In some implementations, the target entity reference is indexed by the respective entity reference of the first entity type. In some implementations, only the difference between attribute values is stored, rather than the entity identifier itself. For example, as shown in FIG. 2, a data structure may include a difference value, an entity identifier, or both.

Figure 13:
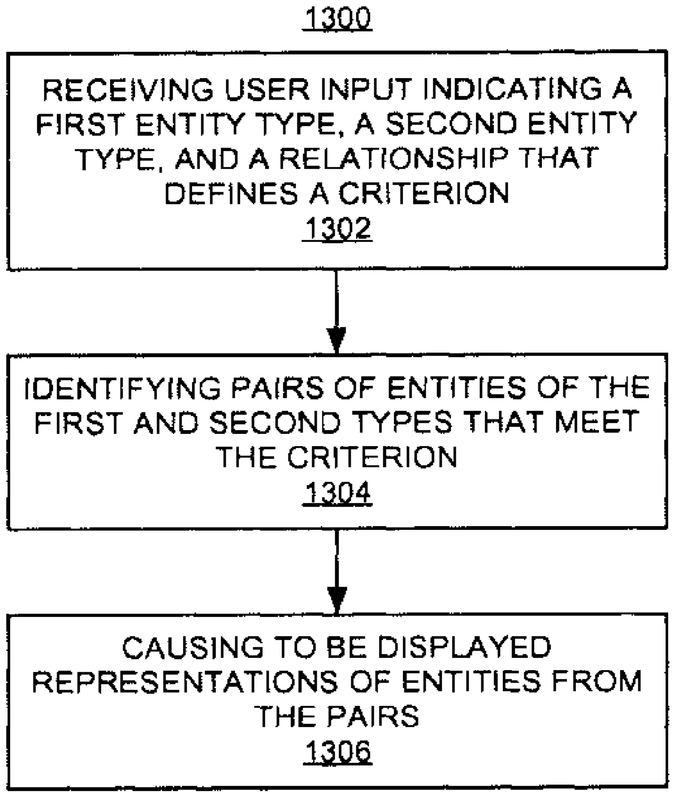
FIG. 13 is a flow diagram of illustrative steps for displaying at least some resultant entity references based on a compositional query in accordance with some implementations of the present disclosure.

FIG. 13 is a flow diagram 1300 of illustrative steps for displaying at least some resultant entity references based on a compositional query in accordance with some implementations of the present disclosure. The illustrative steps of flow diagram 1300 may be rearranged, omitted, or otherwise altered in accordance with some implementations of the present disclosure. It will be understood that while flow diagram 1300 illustrates steps for a first entity type and a second entity type, in some implementations the search system processes any suitable number of entity types.

Step 1302 is the search system receiving user input indicating a first entity type, a second entity type, and relationship that defines a criterion. The user input may include keystrokes such as a typed text string, menu selections, verbal input to a microphone, any other suitable input from a user to the search system, or any combination thereof. For example, the user input may be in the form of a typed query. In a further example, the user input may be in the form of menu selections and corresponding filter settings. The criterion may be explicit, such as [Between 10 and 20 miles], or implicit such as [Near], in which case the search system may determine the meaning of the "Near" criterion.

Step 1304 is the search system identifying pairs of entity references of the first and second entity types that meet the criterion. The pairs include an entity reference of the first entity type and an entity reference of the second entity type, and need not be exclusive. For example, a particular entity of the first entity type may be included in multiple pairs, with various respective entity references of the second entity type. Identifying the pairs includes comparing corresponding attribute values of the entity references of the first and second entity types to determine a difference value, and then comparing the difference value to the criterion.

Step 1306 is the search system causing to be displayed representations of entity references from the identified pairs of step 1304. The search system may cause to be displayed entity references of the first entity type, entity references of the second entity type, or both. The representations may depend on the entity references, entity types, difference values, user input, any other suitable information, or any combination thereof. For example, the search system may display a map, of relevant scale, and location annotations as shown in FIGS. 6, 7, 8, and 9 for difference values that include a distance. In a further example, the search system may display a timeline, of relevant scale, and time annotations as shown in FIG. 10 for difference values that include a time interval. In some implementations, the search system also causes to be displayed one or more filters, menus, text boxes, or other displayed features that allow user interaction. The displayed features may allow the user to, for example, filter the set of entity reference pairs, adjust the display, adjust the query, adjust the criterion, provide any other input, or any combination thereof.

The following figures describe illustrative computer systems that may be used in some implementations of the present disclosure. It will be understood that the knowledge graph and associated techniques may be implemented on any suitable processor or combination of processors that may be, for example, included in one or more computers.

Figure 14:
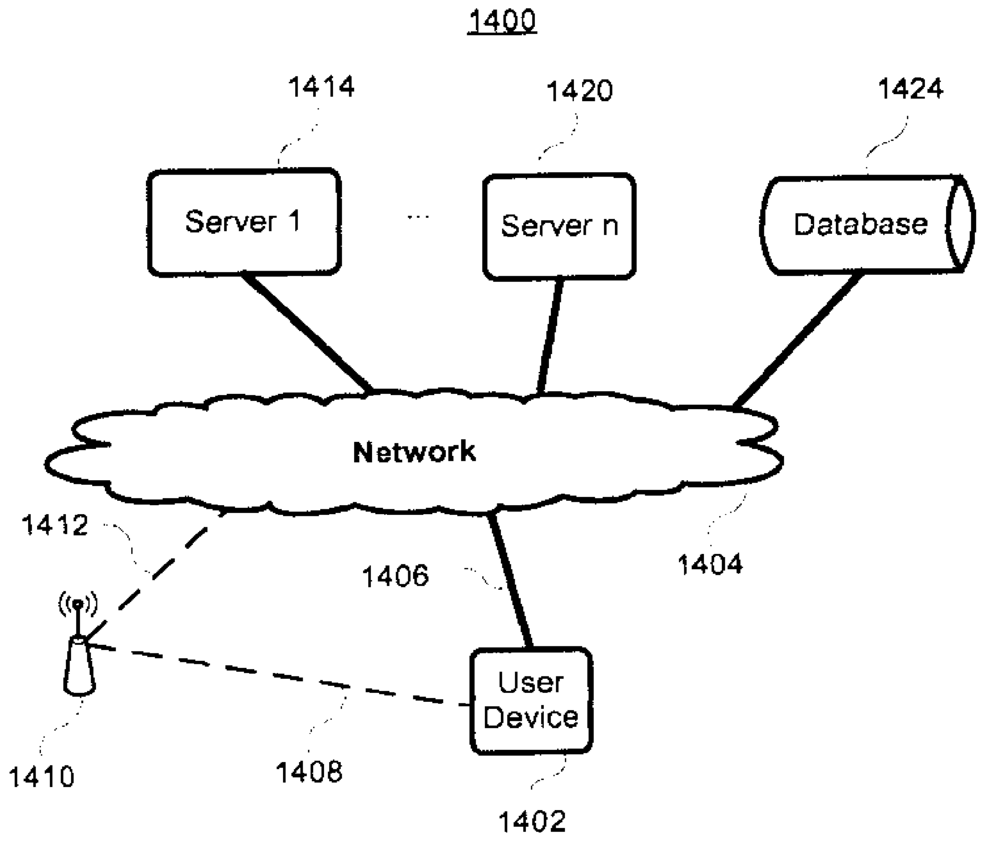
FIG. 14 shows an illustrative computer system in accordance with some implementations of the present disclosure.

FIG. 14 shows an illustrative computer system 1400 in accordance with some implementations of the present disclosure. System 1400 may include one or more user devices 1402. In some implementations, user device 1402 may include a smartphone, tablet computer, desktop computer, laptop computer, personal digital assistant, portable audio player, portable video player, mobile gaming device, other suitable user device capable of providing content, or any combination thereof. In some implementations, a search system is implemented using a computer system such as system 1400, or portions thereof.

User device 1402 may be coupled to network 1404 directly through connection 1406, through wireless repeater 1410, by any other suitable way of coupling to network 1404, or by any combination thereof. Network 1404 may include the Internet, a dispersed network of computers and servers, a local network, a public intranet, a private intranet, other coupled computing systems, or any combination thereof.

User device 1402 may be coupled to network 1404 by wired connection 1406. Connection 1406 may include Ethernet hardware, coaxial cable hardware, DSL hardware, T-1 hardware, fiber optic hardware, analog phone line hardware, any other suitable wired hardware capable of communicating, or any combination thereof. Connection 1406 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

User device 1402 may be wirelessly coupled to network 1404 by wireless connection 1408. In some implementations, wireless repeater 1410 receives transmitted information from user device 1402 by wireless connection 1408 and communicates it with network 1404 by connection 1412. Wireless repeater 1410 receives information from network 1404 by connection 1412 and communicates it with user device 1402 by wireless connection 1408. In some implementations, wireless connection 1408 may include wireless transmission techniques including cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 1412 may include Ethernet hardware, coaxial cable hardware, DSL hardware, T-1 hardware, fiber optic hardware, analog phone line hardware, wireless hardware, any other suitable hardware capable of communicating, or any combination thereof. Connection 1412 may include wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. Connection 1412 may include wireless transmission techniques including cellular phone transmission techniques, code division multiple access or CDMA transmission techniques, global system for mobile communications or GSM transmission techniques, general packet radio service or GPRS transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 1410 may include any number of cellular phone transceivers, network routers, network switches, communication satellites, any other devices for communicating information from user device 1402 to network 1404, or any combination thereof. It will be understood that the arrangement of connection 1406, wireless connection 1408 and connection 1412 is merely illustrative and that system 1400 may include any suitable number of any suitable devices coupling user device 1402 to network 1404. It will also be understood that any user device 1402, may be communicatively coupled with any user device, remote server, local server, any other suitable processing equipment, or any combination thereof, and may be coupled using any suitable technique as described above.

In some implementations, any suitable number of remote servers 1414, 1416, 1418, 1420, may be coupled to network 1404. Remote servers may be general purpose, specific, or any combination thereof. One or more search engine servers 1422 may be coupled to the network 1404. In some implementations, search engine server 1422 may include the knowledge graph, may include processing equipment configured to access the knowledge graph, may include processing equipment configured to receive search queries related to the knowledge graph, may include any other suitable information or equipment, or any combination thereof. One or more database servers 1424 may be coupled to network 1404. In some implementations, database server 1424 may store the knowledge graph. In some implementations, where there is more than one knowledge graph, the more than one may be included in database server 1424, may be distributed across any suitable number of database servers and general purpose servers by any suitable technique, or any combination thereof. It will also be understood that the system may use any suitable number of general purpose, specific purpose, storage, processing, search, any other suitable server, or any combination.

Figure 15:
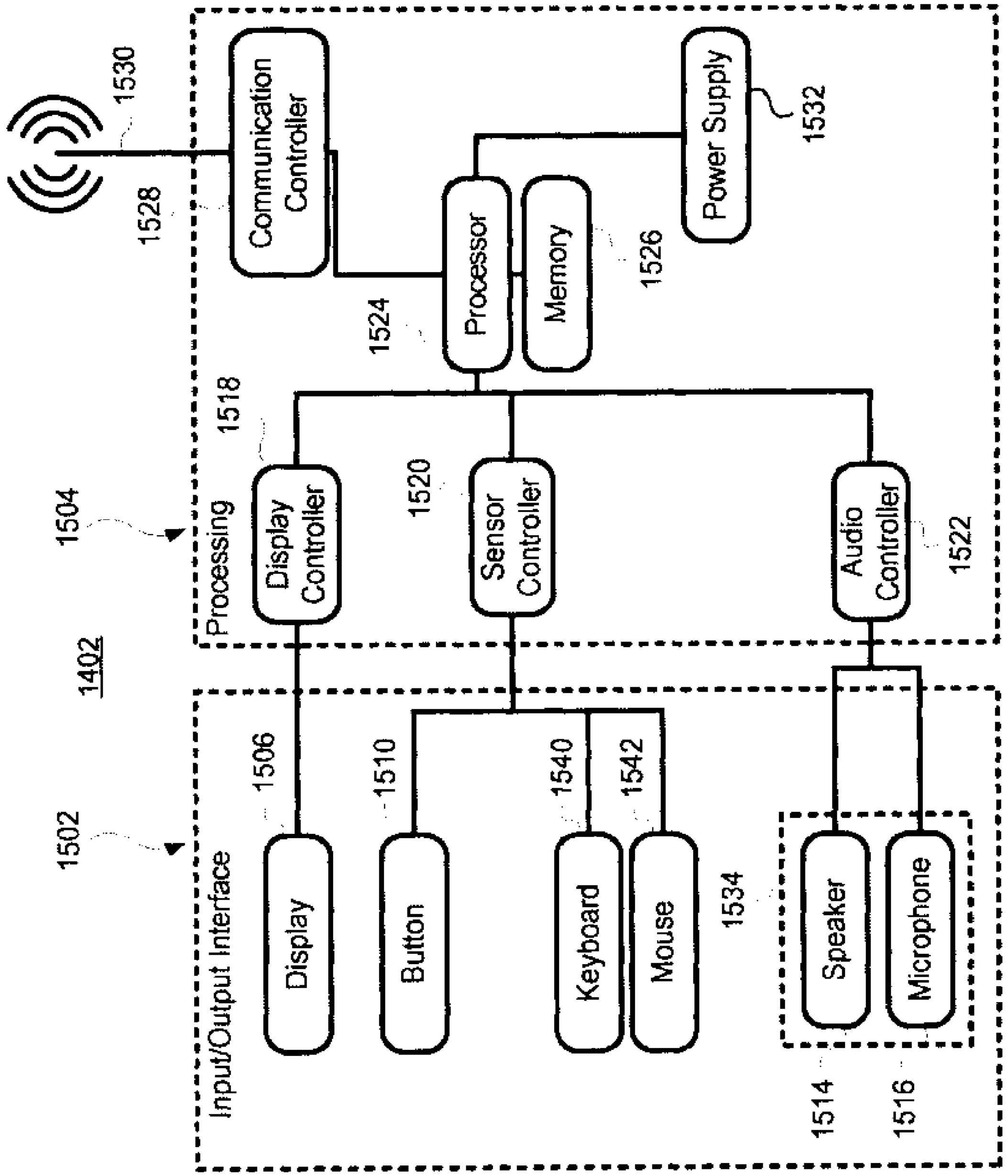
FIG. 15 is a block diagram of a user device of the illustrative computer system of FIG. 14 in accordance with some implementations of the present disclosure.

FIG. 15 is a block diagram of a user device of the illustrative computer system of FIG. 14 in accordance with some implementations of the present disclosure. User device 1402 may include input/output equipment 1502 and processing equipment 1504. Input/output equipment 1502 may include display 1506, touchscreen 1508, button 1510, accelerometer 1512, global positioning system, often abbreviated GPS, receiver 1536, camera 1538, keyboard 1540, mouse 1542, and audio equipment 1534 including speaker 1514 and microphone 1516. In some implementations, the equipment illustrated in FIG. 15 may be representative of equipment included in a smartphone user device. It will be understood that the specific equipment included in the illustrative computer system may depend on the type of user device. For example, the input/output equipment 1502 of a desktop computer may include a keyboard 1540 and mouse 1542 and may omit accelerometer 1512 and GPS receiver 1536. It will be understood that user device 1402 may omit any suitable illustrated elements, and may include equipment not shown such as media drives, data storage, communication devices, display devices, processing equipment, any other suitable equipment, or any combination thereof.

In some implementations, display 1506 may include a liquid crystal display, light emitting diode display, organic light emitting diode display, amorphous organic light emitting diode display, plasma display, cathode ray tube display, projector display, any other suitable type of display capable of displaying content, or any combination thereof. Display 1506 may be controlled by display controller 1518 or by processor 1524 in processing equipment 1504, by processing equipment internal to display 1506, by other controlling equipment, or by any combination thereof. In some implementations, display 1506 may display data from a knowledge graph.

Touchscreen 1508 may include a sensor capable of sensing pressure input, capacitance input, resistance input, piezoelectric input, optical input, acoustic input, any other suitable input, or any combination thereof. Touchscreen 1508 may be capable of receiving touch-based gestures. Received gestures may include information relating to one or more locations on the surface of touchscreen 1508, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 1508 may be optically transparent and located above or below display 1506. Touchscreen 1508 may be coupled to and controlled by display controller 1518, sensor controller 1520, processor 1524, any other suitable controller, or any combination thereof. In some implementations, touchscreen 1508 may include a virtual keyboard capable of receiving, for example, a search query used to identify data in a knowledge graph.

In some embodiments, a gesture received by touchscreen 1508 may cause a corresponding display element to be displayed substantially concurrently, e.g., immediately following or with a short delay, by display 1506. For example, when the gesture is a movement of a finger or stylus along the surface of touchscreen 1508, the search system may cause a visible line of any suitable thickness, color, or pattern indicating the path of the gesture to be displayed on display 1506. In some implementations, for example, a desktop computer using a mouse, the functions of the touchscreen may be fully or partially replaced using a mouse pointer displayed on the display screen.

Button 1510 may be one or more electromechanical push-button mechanism, slide mechanism, switch mechanism, rocker mechanism, toggle mechanism, other suitable mechanism, or any combination thereof. Button 1510 may be included in touchscreen 1508 as a predefined region of the touchscreen, e.g., soft keys. Button 1510 may be included in touchscreen 1508 as a region of the touchscreen defined by the search system and indicated by display 1506. Activation of button 1510 may send a signal to sensor controller 1520, processor 1524, display controller 1520, any other suitable processing equipment, or any combination thereof. Activation of button 1510 may include receiving from the user a pushing gesture, sliding gesture, touching gesture, pressing gesture, time-based gesture, e.g., based on the duration of a push, any other suitable gesture, or any combination thereof.

Accelerometer 1512 may be capable of receiving information about the motion characteristics, acceleration characteristics, orientation characteristics, inclination characteristics and other suitable characteristics, or any combination thereof, of user device 1402. Accelerometer 1512 may be a mechanical device, microelectromechanical device, nanoelectromechanical device, solid state device, any other suitable sensing device, or any combination thereof. In some implementations, accelerometer 1512 may be a 3-axis piezoelectric microelectromechanical integrated circuit which is configured to sense acceleration, orientation, or other suitable characteristics by sensing a change in the capacitance of an internal structure. Accelerometer 1512 may be coupled to touchscreen 1508 such that information received by accelerometer 1512 with respect to a gesture is used at least in part by processing equipment 1504 to interpret the gesture.

Global positioning system, often abbreviated GPS, receiver 1536 may be capable of receiving signals from global positioning satellites. In some implementations, GPS receiver 1536 may receive information from one or more satellites orbiting the earth, the information including time, orbit, and other information related to the satellite. This information may be used to calculate the location of user device 1402 on the surface of the earth. GPS receiver 1536 may include a barometer, not shown, to improve the accuracy of the location. GPS receiver 1536 may receive information from other wired and wireless communication sources regarding the location of user device 1402. For example, the identity and location of nearby cellular phone towers may be used in place of, or in addition to, GPS data to determine the location of user device 1402.

Camera 1538 may include one or more sensors to detect light. In some implementations, camera 1538 may receive video images, still images, or both. Camera 1538 may include a charged coupled device, a complementary metal oxide semiconductor sensor, a photocell sensor, an IR sensor, any other suitable sensor, or any combination thereof. In some implementations, camera 1538 may include a device capable of generating light to illuminate a subject, for example, a light emitting diode. Camera 1538 may communicate information captured by the one or more sensors to sensor controller 1520, to processor 1524, to any other suitable equipment, or any combination thereof. Camera 1538 may include lenses, filters, and other suitable optical equipment. It will be understood that user device 1402 may include any suitable number of cameras 1538.

Audio equipment 1534 may include sensors and processing equipment for receiving and transmitting information using acoustic or pressure waves. Speaker 1514 may include equipment to produce acoustic waves in response to a signal. In some implementations, speaker 1514 may include an electroacoustic transducer wherein an electromagnet is coupled to a diaphragm to produce acoustic waves in response to an electrical signal. Microphone 1516 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by user device 1402.

Speaker 1514 and microphone 1516 may be contained within user device 1402, may be remote devices coupled to user device 1402 by any suitable wired or wireless connection, or any combination thereof.

Speaker 1514 and microphone 1516 of audio equipment 1534 may be coupled to audio controller 1522 in processing equipment 1504. This controller may send and receive signals from audio equipment 1534 and perform pre-processing and filtering steps before transmitting signals related to the input signals to processor 1524. Speaker 1514 and microphone 1516 may be coupled directly to processor 1524. Connections from audio equipment 1534 to processing equipment 1504 may be wired, wireless, other suitable arrangements for communicating information, or any combination thereof.

Processing equipment 1504 of user device 1402 may include display controller 1518, sensor controller 1520, audio controller 1522, processor 1524, memory 1526, communication controller 1528, and power supply 1532.

Processor 1524 may include circuitry to interpret signals input to user device 1402 from, for example, touchscreen 1508 and microphone 1516. Processor 1524 may include circuitry to control the output to display 1506 and speaker 1514. Processor 1524 may include circuitry to carry out instructions of a computer program. In some implementations, processor 1524 may be an integrated electronic circuit based, capable of carrying out the instructions of a computer program and include a plurality of inputs and outputs.

Processor 1524 may be coupled to memory 1526. Memory 1526 may include random access memory, often abbreviated RAM, flash memory, programmable read only memory, often abbreviated PROM, erasable programmable read only memory, often abbreviated EPROM, magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 1518, sensor controller 220, and audio controller 1522, as have been described above, may be fully or partially implemented as discrete components in user device 1402, fully or partially integrated into processor 1524, combined in part or in full into combined control units, or any combination thereof.

Communication controller 1528 may be coupled to processor 1524 of user device 1402. In some implementations, communication controller 1528 may communicate radio frequency signals using antenna 1530. In some implementations, communication controller 1528 may communicate signals using a wired connection, not shown. Wired and wireless communications communicated by communication controller 1528 may use Ethernet, amplitude modulation, frequency modulation, bitstream, code division multiple access, often abbreviated CDMA, global system for mobile communications, often abbreviated GSM, general packet radio service, often abbreviated GPRS, satellite, infrared, Bluetooth, Wi-Fi, WiMax, any other suitable communication configuration, or any combination thereof. The functions of communication controller 1528 may be fully or partially implemented as a discrete component in user device 1402, may be fully or partially included in processor 1524, or any combination thereof. In some implementations, communication controller 1528 may communicate with a network such as network 1404 of FIG. 14 and may receive information from a knowledge graph stored, for example, in database 1424 of FIG. 14.

Power supply 1532 may be coupled to processor 1524 and to other components of user device 1402. Power supply 1532 may include a lithium-polymer battery, lithium-ion battery, NiMH battery, alkaline battery, lead-acid battery, fuel cell, solar panel, thermoelectric generator, any other suitable power source, or any combination thereof. Power supply 1532 may include a hard wired connection to an electrical power source, and may include electrical equipment to convert the voltage, frequency, and phase of the electrical power source input to suitable power for user device 1402. In some implementations of power supply 1532, a wall outlet may provide 120 volts, 60 Hz alternating current, often abbreviated AC. A circuit of transformers, resistors, inductors, capacitors, transistors, and other suitable electronic components included in power supply 1532 may convert the 120V AC from a wall outlet power to 5 volts at 0 Hz, e.g., direct current. In some implementations of power supply 1532, a lithium-ion battery including a lithium metal oxide-based cathode and graphite-based anode may supply 3.7V to the components of user device 1402. Power supply 1532 may be fully or partially integrated into user device 1402, or may function as a stand-alone device. Power supply 1532 may power user device 1402 directly, may power user device 1402 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:

receiving a single compositional query that includes at least a term identifying a first entity type, at least a term identifying a second entity type, and a distance relationship;

identifying, based on the single compositional query, a plurality of first candidate entity references of the first entity type;

identifying, based on the single compositional query, a plurality of second candidate entity references of the second entity type;

determining pairs of first candidate entity references and second candidate entity references that meet the distance relationship;

generating a user interface in response to the single compositional query, that identifies at least some of the pairs of the first candidate entity references and the second candidate entity references, the user interface including at least two of the first candidate entity references and at least two of the second candidate entity references and a user-adjustable graphical element used to adjust the distance relationship; and providing the user interface as a response to the single compositional query.

2. The method of claim 1, wherein each of the first candidate entity references and the second candidate entity references have a location attribute, and wherein determining the pairs of the first candidate entity references and the second candidate entity references that meet the distance relationship comprises determining corresponding distances based on the location attributes.

3. The method of claim 1, wherein the user interface includes a map interface that includes annotations for the at least two of the first candidate entity references and the at least two of the second candidate entity references.

4. The method of claim 3, wherein the annotations are icons and the icons for the at least two of the first candidate entity references differ from the icons for the at least two of the second candidate entity references.

5. The method of claim 2, wherein the distance relationship is an implicit term and the method further comprises determining the distance relationship based on the distance relationship being predefined for the implicit term.

6. The method of claim 1, wherein the distance relationship is a relative spatial relationship.

7. The method of claim 1, wherein the plurality of first candidate entity references and the plurality of second candidate entity references are identified using a knowledge graph.

8. The method of claim 1, wherein the plurality of first candidate entity references and the plurality of second candidate entity references are identified based on a pre-generated table that is indexed by entity reference and entity type.

9. The method of claim 1, wherein the plurality of first candidate entity references and the plurality of second candidate entity references are identified based on documents that are responsive to the single compositional query.

10. A system comprising:

at least one processor;

a display device; and memory storing instructions that, when executed by the at least one processor, cause the system to perform operations including:

receiving a single compositional query that includes at least a term identifying a first entity type, at least a term identifying a second entity type, and a distance relationship;

identifying, based on the single compositional query, a plurality of first candidate entity references of the first entity type;

identifying, based on the single compositional query, a plurality of second candidate entity references of the second entity type;

determining pairs of first candidate entity references and second candidate entity references that meet the distance relationship;

generating a user interface in response to the single compositional query, that identifies at least some of the pairs of the first candidate entity references and the second candidate entity references, the user interface including at least two of the first candidate entity references and at least two of the second candidate entity references and a user-adjustable graphical element used to adjust the distance relationship; and providing the user interface as a response to the single compositional query.

11. The system of claim 10, wherein each of the first candidate entity references and the second candidate entity references have a location attribute, and wherein determining the pairs of the first candidate entity references and the second candidate entity references that meet the distance relationship comprises determining corresponding distances based on the location attributes.

12. The system of claim 10, wherein the user interface includes a map interface that includes annotations for the at least two of the first candidate entity references and the at least two of the second candidate entity references.

13. The system of claim 12, wherein the annotations are icons and the icons for the at least two of the first candidate entity references differ from the icons for the at least two of the second candidate entity references.

14. The system of claim 10, wherein the distance relationship is an implicit term and the operations further include determining the distance relationship based on the distance relationship being predefined for the implicit term.

15. The system of claim 10, wherein the distance relationship is a relative spatial relationship.

16. The system of claim 10, wherein the plurality of first candidate entity references and the plurality of second candidate entity references are identified using a knowledge graph.

17. The system of claim 10, wherein the plurality of first candidate entity references and the plurality of second candidate entity references are identified based on a pre-generated table that is indexed by entity reference and entity type.

18. The system of claim 10, wherein the plurality of first candidate entity references and the plurality of second candidate entity references are identified based on documents that are responsive to the single compositional query.

19. A non-transitory computer-readable medium storing instructions that, when executed by at least one processor, cause a computing system to perform operations comprising:

receiving a single compositional query that includes at least a term identifying a first entity type, at least a term identifying a second entity type, and a distance relationship;

identifying, based on the single compositional query, a plurality of first candidate entity references of the first entity type;

identifying, based on the single compositional query, a plurality of second candidate entity references of the second entity type;

determining pairs of first candidate entity references and second candidate entity references that meet the distance relationship;

generating a user interface in response to the single compositional query, that identifies at least some of the pairs of the first candidate entity references and the second candidate entity references, the user interface including a map interface that includes annotations for at least two of the first candidate entity references and at least two of the second candidate entity references; and providing the user interface as a response to the single compositional query.

* * * * *